(12) United States Patent
Jang et al.

(10) Patent No.: US 12,075,485 B2
(45) Date of Patent: Aug. 27, 2024

(54) METHOD AND APPARATUS FOR SUPPORTING A SUPPLEMENTARY UPLINK FREQUENCY IN WIRELESS COMMUNICATION SYSTEM

(71) Applicant: Samsung Electronics Co., Ltd., Suwon-si (KR)

(72) Inventors: Jaehyuk Jang, Suwon-si (KR); Sangbum Kim, Suwon-si (KR); Donggun Kim, Seoul (KR); Alexander Sayenko, Seoul (KR); Seungri Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 218 days.

(21) Appl. No.: 17/862,053

(22) Filed: Jul. 11, 2022

(65) Prior Publication Data

US 2022/0346155 A1 Oct. 27, 2022

Related U.S. Application Data

(63) Continuation of application No. 17/221,301, filed on Apr. 2, 2021, now Pat. No. 11,388,759, which is a
(Continued)

(30) Foreign Application Priority Data

Aug. 7, 2017 (KR) .................. 10-2017-0099778

(51) Int. Cl.
*H04W 74/0833* (2024.01)
*H04L 1/1812* (2023.01)
(Continued)

(52) U.S. Cl.
CPC ....... *H04W 74/0833* (2013.01); *H04L 1/1812* (2013.01); *H04W 72/0446* (2013.01);
(Continued)

(58) Field of Classification Search
USPC ......................................... 370/329
See application file for complete search history.

(56) References Cited

U.S. PATENT DOCUMENTS 11,483,387 B2 * 10/2022 Elmegreen ............. H04W 4/38
11,871,341 B2 * 1/2024 Chen .................... H04W 48/20
(Continued)

FOREIGN PATENT DOCUMENTS

CN 102415155 A 4/2012
CN 104919885 A 9/2015
(Continued)

OTHER PUBLICATIONS

Indian Office Action dated Sep. 9, 2022, issued in a counterpart Indian Application No. 201814028873.
(Continued)

*Primary Examiner* — Gregory B Sefcheck
*Assistant Examiner* — Majid Esmaeilian
(74) *Attorney, Agent, or Firm* — Jefferson IP Law, LLP

(57) ABSTRACT

The disclosure relates to a communication technique and a system thereof that fuses a 5G communication system for supporting higher data rate after a 4G system. The disclosure is enabled to be applied to intelligent services (for example, smart home, smart building, smart city, smart car or connected car, health care, digital education, retail, security and safety related services, etc.) based on 5G communication technology and IoT related technology. A method for performing a random access by a terminal is provided. The method includes receiving information for performing a random access from a base station (BS), determining a frequency band to perform the random access among a first frequency band and a second frequency band based on the
(Continued)

information for performing the random access, and transmitting a first random access preamble to the BS on the determined frequency band.

12 Claims, 20 Drawing Sheets

Related U.S. Application Data continuation of application No. 16/050,573, filed on Jul. 31, 2018, now Pat. No. 10,973,056.

(51) Int. Cl.
*H04W 72/0446* (2023.01)
*H04W 72/0453* (2023.01)
*H04W 72/23* (2023.01)
*H04W 76/28* (2018.01)
*H04W 74/00* (2009.01)
*H04W 74/08* (2009.01)

(52) U.S. Cl.
CPC ....... *H04W 72/0453* (2013.01); *H04W 72/23* (2023.01); *H04W 76/28* (2018.02); *H04W 74/006* (2013.01); *H04W 74/0866* (2013.01)

(56) References Cited

U.S. PATENT DOCUMENTS

| | | | |
|---|---|---|---|
| 2010/0238986 A1 | 9/2010 | Gholmieh et al. | |
| 2010/0296467 A1 | 11/2010 | Pelletier et al. | |
| 2012/0002643 A1 | 1/2012 | Chung et al. | |
| 2012/0140743 A1 | 6/2012 | Pelletier et al. | |
| 2013/0201960 A1 | 8/2013 | Kim et al. | |
| 2014/0119265 A1 | 5/2014 | Shauh et al. | |
| 2014/0241220 A1 | 8/2014 | Choi et al. | |
| 2015/0181546 A1 | 6/2015 | Freda et al. | |
| 2015/0223270 A1 | 8/2015 | Kim et al. | |
| 2015/0341865 A1 | 11/2015 | Yang et al. | |
| 2015/0341914 A1 | 11/2015 | Lee et al. | |
| 2015/0373740 A1 | 12/2015 | Eriksson et al. | |
| 2016/0037562 A1 | 2/2016 | Kim et al. | |
| 2016/0143035 A1 | 5/2016 | Xue et al. | |
| 2016/0150571 A1 | 5/2016 | Pelletier et al. | |
| 2016/0219626 A1 | 7/2016 | Martin | |
| 2016/0262187 A1 | 9/2016 | Ohuchi et al. | |
| 2016/0278055 A1 | 9/2016 | Park et al. | |
| 2017/0013643 A1 | 1/2017 | Nan et al. | |
| 2017/0019894 A1 | 1/2017 | Nimbalker et al. | |
| 2017/0150367 A1 | 5/2017 | Han et al. | |
| 2017/0289981 A1 | 10/2017 | Kim et al. | |
| 2018/0124836 A1* | 5/2018 | Hong ................. H04W 74/008 |
| 2018/0139030 A1 | 5/2018 | Kim et al. | |
| 2018/0376339 A1 | 12/2018 | Hu et al. | |
| 2019/0045536 A1 | 2/2019 | Gao et al. | |
| 2019/0069256 A1* | 2/2019 | Jung ..................... H04L 5/005 |
| 2019/0191428 A1 | 6/2019 | Yan et al. | |
| 2019/0215870 A1* | 7/2019 | Babaei .................. H04L 5/0092 |
| 2019/0357262 A1* | 11/2019 | Cirik ....................... H04L 5/001 |
| 2020/0015266 A1* | 1/2020 | Yan ................... H04W 74/0833 |
| 2020/0128564 A1 | 4/2020 | Takeda et al. | |
| 2020/0322098 A1 | 10/2020 | Lei | |
| 2020/0404617 A1* | 12/2020 | Murray ................. H04W 68/02 |
| 2021/0144560 A1 | 5/2021 | Sesia et al. | |
| 2021/0168874 A1* | 6/2021 | Wei ....................... H04W 72/23 |
| 2021/0289548 A1* | 9/2021 | Murray ............... H04W 74/006 |
| 2022/0039068 A1* | 2/2022 | Hoglund ............... H04W 76/20 |
| 2022/0240326 A1* | 7/2022 | Rune .................... H04W 56/001 |
| 2024/0080784 A1* | 3/2024 | Lin ................... H04W 74/0833 |

FOREIGN PATENT DOCUMENTS

| | | | |
|---|---|---|---|
| CN | 105940753 A | | 9/2016 |
| JP | 2013-511863 A | | 4/2013 |
| JP | 2014-180032 A | | 9/2014 |
| KR | 10-2013-0090804 A | | 8/2013 |
| KR | 10-2016-0093678 A | | 8/2016 |
| KR | 10-2018-0055662 A | | 5/2018 |
| WO | 2012/074878 A2 | | 6/2012 |
| WO | 2013/026184 A1 | | 2/2013 |
| WO | 2014/112905 A1 | | 7/2014 |
| WO | 2016/074599 A1 | | 5/2016 |
| WO | 2018/230603 A1 | | 12/2018 |

OTHER PUBLICATIONS

European Extended Search Report dated Jan. 2, 2019, issued in European Application No. 18187500.6-1215.
Huawei et al: "Consideration on LTE-NR co-existence", 3GPP Draft; R2-1707423 Consideration on LTE-NR Co-Existence V01, 3RD Generation Partnership Project (3GPP), Mobile Competence Centre ; 650, Route Des Lucioles ; F-06921 Sophia-Antipolis Cedex ; FRANCE, vol. RAN WG3, no. Qingdao, China; Jun. 27, 2017-Jun 29, 2017 Jun. 26, 2017 (Jun. 26, 2017), XP051301912, Retrieved from the Internet: URL: http://www.3gpp.org/ftp/Meetings_3GPP_SYNC/RAN2/Docs/ [retrieved on Jun. 26, 2017].
European Office Action dated Feb. 19, 2020, issued in a counterpart European Application No. 18 187 500.6-1215.
Indian Office Action dated Jun. 30, 2020, issued in a counterpart Indian Application No. 201814028873.
Korean Office Action dated Jun. 16, 2021, issued in a counterpart Korean Application No. 10-2017-0099778.
LG Electronics, R1-1710354, Remaining details on UL sharing between LTE and NR, 3GPP TSG RAN WG1 #AH, Jun. 17, 2017.
A Decision to Grant a Patent dated Dec. 8, 2021, issued in a counterpart Korean Application No. 10-2017-0099778.
Chinese Office Action dated Jan. 4, 2022, issued in a counterpart Chinese Application No. 201810876480.6.
Extended European Search Report dated Feb. 10, 2022, issued in a counterpart European Application No. 21203226.2-1215.
European Office Action dated Oct. 19, 2023, issued in European Patent Application No. 21203226.2.

* cited by examiner

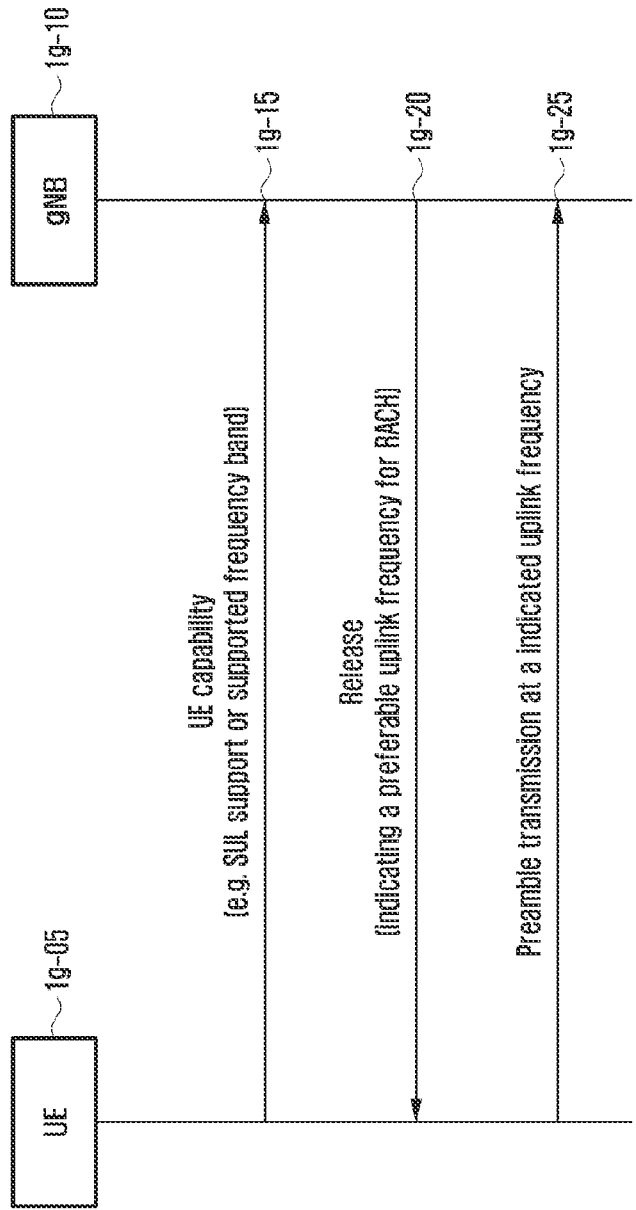

METHOD AND APPARATUS FOR SUPPORTING A SUPPLEMENTARY UPLINK FREQUENCY IN WIRELESS COMMUNICATION SYSTEM

CROSS-REFERENCE TO RELATED APPLICATION(S)

This application is a continuation application of prior application Ser. No. 17/221,301, filed on Apr. 2, 2021, which is a continuation application of prior application Ser. No. 16/050,573, filed on Jul. 31, 2018, which issued as U.S. Pat. No. 10,973,056 on Apr. 6, 2021 and was based on and claimed priority under 35 U.S.C § 119(a) of a Korean patent application number 10-2017-0099778, filed on Aug. 7, 2017, in the Korean Intellectual Property Office, the disclosure of which is incorporated by reference herein in its entirety.

BACKGROUND

1. Field

The disclosure relates to a terminal, a base station, and operations thereof in a mobile communication system.

2. Description of Related Art

In addition, the disclosure relates to a method for reducing power consumption and configuring data transmission delay for each transmission unit when a terminal performs a discontinuous reception (DRX) operation in a wireless communication system in which a plurality of transmission units coexists.

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency millimeter wave (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, Hybrid frequency shift keying (FSK) and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method that can reduce power consumption and configure a data transmission delay for each transmission unit when a terminal performs a discontinuous reception (DRX) operation in a wireless communication system in which a plurality of transmission units coexists.

Additional aspects will be set forth in part in the description which follows and, in part, will be apparent from the description, or may be learned by practice of the presented embodiments.

In accordance with an aspect of the disclosure, a method for performing a random access by a terminal is provided. The method includes receiving information for performing a random access from a base station (BS), determining a frequency band to perform the random access among a first frequency band and a second frequency band based on the information for performing the random access, and transmitting a first random access preamble to the BS on the determined frequency band.

The information for performing the random access may include at least one of threshold value information for determining the frequency band or information on power for transmitting the first random access preamble.

The frequency band to perform the random access may be determined among the first frequency band the second frequency band based on the threshold value information for determining the frequency band and power information of the terminal.

The method for performing the random access by the terminal may further include receiving information for changing the frequency band from the BS via downlink control information (DCI), and transmitting a second preamble for performing the random access to the BS on the changed frequency band.

In accordance with another aspect of the disclosure, a method for performing a random access by a base station (BS) in a wireless communication system is provided. The method includes generating information for performing a random access in a first frequency band or a second frequency band, transmitting the generated information to a terminal, and receiving a random access preamble for performing the random access from the terminal on a frequency band determined based on the generated information.

The information for performing the random access may include at least one of threshold value information for determining the frequency band or information on power for transmitting the random access preamble.

The decided frequency band may be determined based on the threshold value information for determining the frequency band and power information of the terminal.

The method for performing the random access by the base station may further include: generating information for changing the determined frequency band, and transmitting the information for changing the determined frequency band to the terminal via downlink control information (DCI).

In accordance with another aspect of the disclosure, a terminal is provided. The terminal includes a transceiver, and at least one processor configured to control the transceiver to receive information for performing a random access from a base station (BS), determine a frequency band to perform the random access among a first frequency band and a second frequency band based on the information for performing the random access, and control the transceiver to transmit a first random access preamble to the BS on the determined frequency band.

The information for performing the random access may include at least one of threshold value information for determining the frequency band or information on power for transmitting the first random access preamble.

The at least one processor may determine the frequency band to perform the random access among the first frequency band and the second frequency band based on the threshold value information for determining the frequency band and power information of the terminal.

The at least one processor may control the transceiver to receive information for changing the frequency band from the BS via downlink control information (DCI) and control the transceiver to transmit a second random access preamble for performing the random access to the BS on the changed frequency band.

In accordance with another aspect of the disclosure, a base station is provided. The base station includes a transceiver, and at least one processor configured to generate information for performing a random access in a first frequency band or a second frequency band, control the transceiver to transmit the generated information to the terminal, and control the transceiver to receive, from the terminal, a random access preamble for performing the random access on a frequency band determined based on the generated information.

The information for performing the random access may include at least one of threshold value information for determining the frequency band or information on power for transmitting the random access preamble.

The at least one processor may generate information for changing the determined frequency band and control the transceiver to transmit information for changing the determined frequency band to the terminal via downlink control information (DCI).

According to another embodiment of the disclosure, a terminal can operate a configuration of a specific timer according to a transmission unit among DRX operations according to a transmission unit of each serving cell and adjust and reduce a transmission delay.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1G is a diagram for describing a process of configuring one uplink frequency to a terminal that switches a connection mode to a standby mode according to an embodiment of the disclosure;

FIG. 1I is a block diagram illustrating a configuration of a base station according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

First Embodiment

Figure 1A:
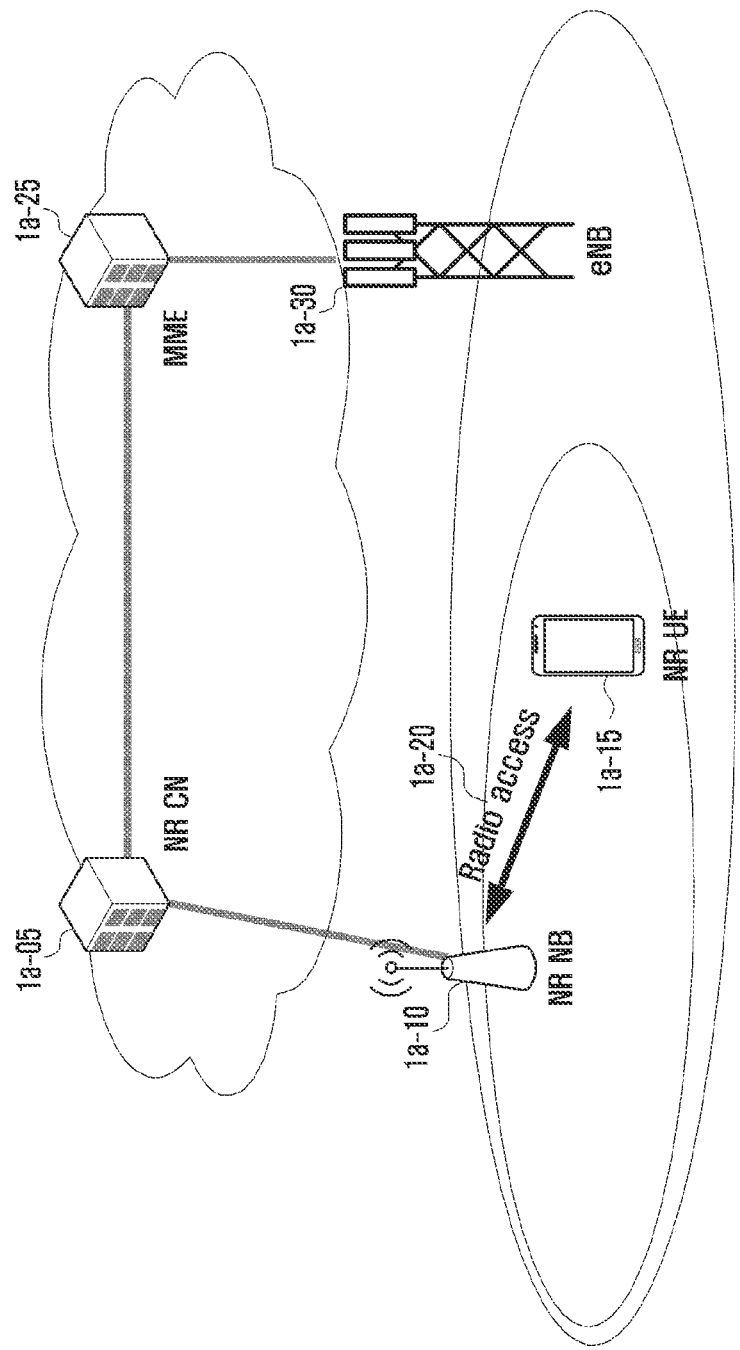
FIG. 1A is a diagram illustrating a structure of a next-generation mobile communication system according to an embodiment of the disclosure.

FIG. 1A is a diagram illustrating a structure of a next-generation mobile communication system according to an embodiment of the disclosure.

Referring to FIG. 1A, a radio access network of a next-generation mobile communication system includes a new radio base station (new radio node B, hereinafter, referred to as NR NB) 1a-10 and a new radio core network (NR CN) 1a-05. A user terminal (new radio user equipment, hereinafter, referred to as NR UE or terminal) 1a-15 is connected to an external network through the NR NB 1a-10 and the NR CN 1a-05.

In FIG. 1A, the NR NB 1a-10 corresponds to an (evolved node B (eNB) of the existing long term evolution (LTE) system. The NR NB may be connected to the NR UE 1a-15 via a radio channel and may provide a superior service to the existing Node B. In the next-generation mobile communication system, since all user traffic is served through a shared channel, a device is required, which collects and schedules state information such as a buffer statue, an available transmission power state, and a channel state of UEs and the NR NB 1a-10 takes charge of collecting and scheduling the state information. One NR NB typically controls multiple cells. In order to implement high-speed data transmission compared to existing LTE, an existing maximum bandwidth or more may be provided and additionally, beam-forming technology may be merged using orthogonal frequency division multiplexing (OFDM) as a radio access technology. Further, an adaptive modulation & coding (AMC) scheme is adopted, which determines a modulation scheme and a channel coding rate according to the channel state of the terminal. The NR CN 1a-05 performs functions such as mobility support, bearer configuration, and a QoS configuration. The NR CN as a device that is in charge of various control functions as well as a mobility management function for the terminal is connected to multiple base stations. In addition, the next-generation mobile communication system may interlock with the existing LTE system and the NR CN is connected to a mobile management entity (MME) 1a-25 through a network interface. The MME is connected with an eNB 1a-30 which is the existing base station.

Figure 1B:
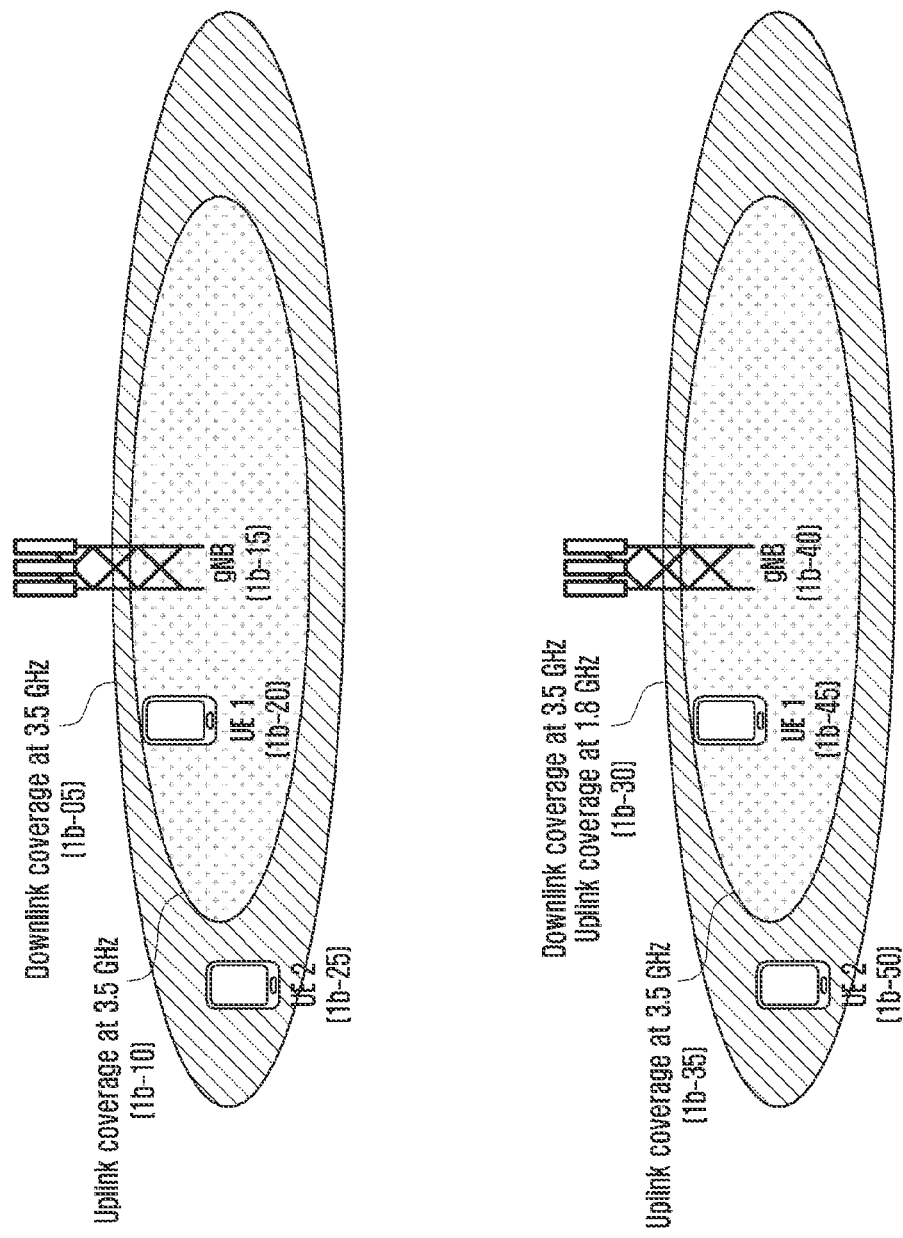
FIG. 1B is a conceptual diagram for applying a supplementary uplink frequency according to an embodiment of the disclosure.

FIG. 1B is a conceptual diagram for applying a supplementary uplink frequency according to an embodiment of the disclosure.

Referring to FIG. 1B, in the mobile communication system, inconsistency of the service areas in the uplink and downlink may occur. The inconsistency occurs because channel characteristics of the uplink and the downlink are different or maximum transmission power of the terminal is limited. Typically, the downlink service area is wider than the uplink service area. For example, in a 3.5 GHz time division duplex (TDD) system, the downlink service area 1b-05 is wider than the uplink service area 1b-10. In this case, a first terminal 1b-20 does not have a problem in receiving the service in the uplink and the downlink, but the second terminal 1b-25 has a problem in successfully transmitting data to a base station 1b-15. Accordingly, in order to eliminate the problem due to the inconsistency, an effective service area of the downlink is reduced to coincide with the uplink. That is, although the downlink may provide a wider service area, the uplink service area is also limited.

In the next-generation mobile communication system, the terminal may apply the uplink frequency having a wider service area in order to solve the performance limitation due to such inconsistency. That is, a supplementary uplink (1b-30) of 1.8 GHz apart from the uplink (1b-35) of 3.5 GHz is additionally provided to the terminal. Due to the frequency characteristics, the lower a frequency band, the longer a radio signal propagation distance. Thus, a frequency of 1.8 GHz, which is lower than 3.5 GHz, enables the wider service area for the terminal. Therefore, a second terminal 1b-50 may successfully transmit data to the base station 1b-40 using the uplink 1b-30 of 1.8 GHz. Further, since a first terminal 1b-45 may use both the 1.8 GHz and 3.5 GHz uplinks irrespective of a service area problem, the first terminal 1b-45 may select and use one of 1.8 GHz and 3.5 GHz for the purpose of dispersing an uplink access congestion. The supplementary uplink frequency may be an LTE frequency.

Figure 1C:
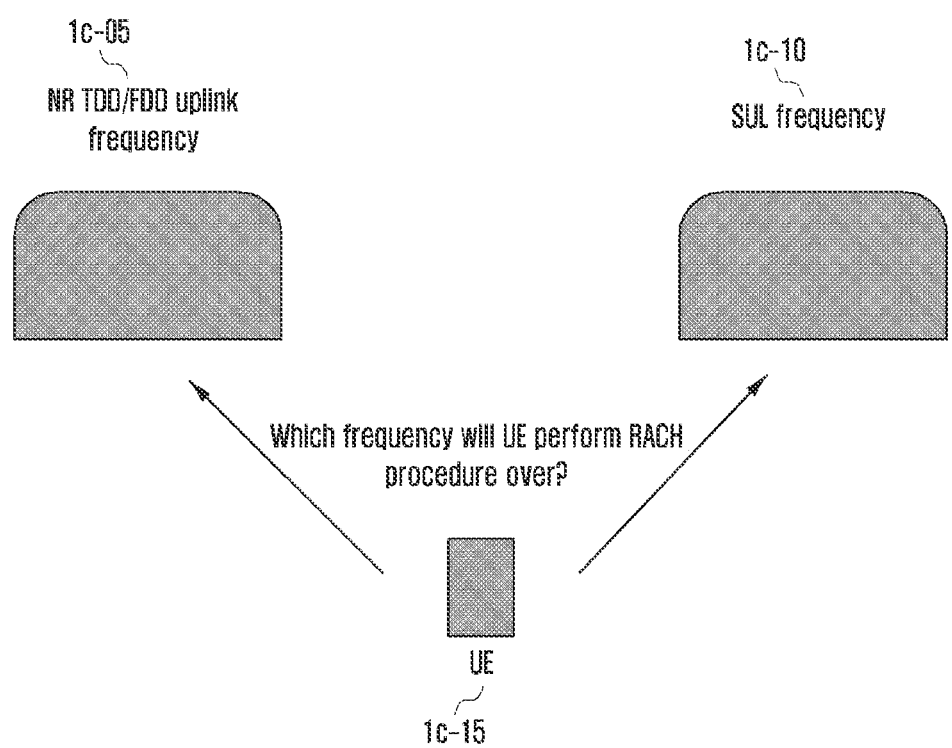
FIG. 1C is a conceptual diagram in which a terminal selects a plurality of uplink frequencies according to an embodiment of the disclosure.

FIG. 1C is a conceptual diagram in which a terminal selects a plurality of uplink frequencies according to an embodiment of the disclosure.

Referring to FIG. 1C, as mentioned above, the terminal needs to decide which frequency to use among a plurality of uplink frequencies. For example, a terminal 1c-15 selects one of the next generation mobile communication frequency 1c-05 of 3.5 GHz and the supplementary uplink frequency 1c-10 of 1.8 GHz to attempt the random access. Although the terminal may use both uplink frequencies, complexity increases in order to support the use of both uplink frequencies. Therefore, in the disclosure, it is assumed that the random access and uplink data transmission are performed by selecting one of the plurality of uplink frequencies provided by the base station. That is, the plurality of uplink frequencies is not used at the same time. A terminal in a standby mode selects the uplink frequency to attempt the random access using predetermined information provided from the base station through system information. In order to limit the complexity, the terminal in a connection mode may not change the used uplink dynamically, but may change the used uplink semi-statically. In order to change the uplink used, the terminal performs a random access (i.e., preamble transmission) at a new uplink frequency to be used.

Figure 1D:
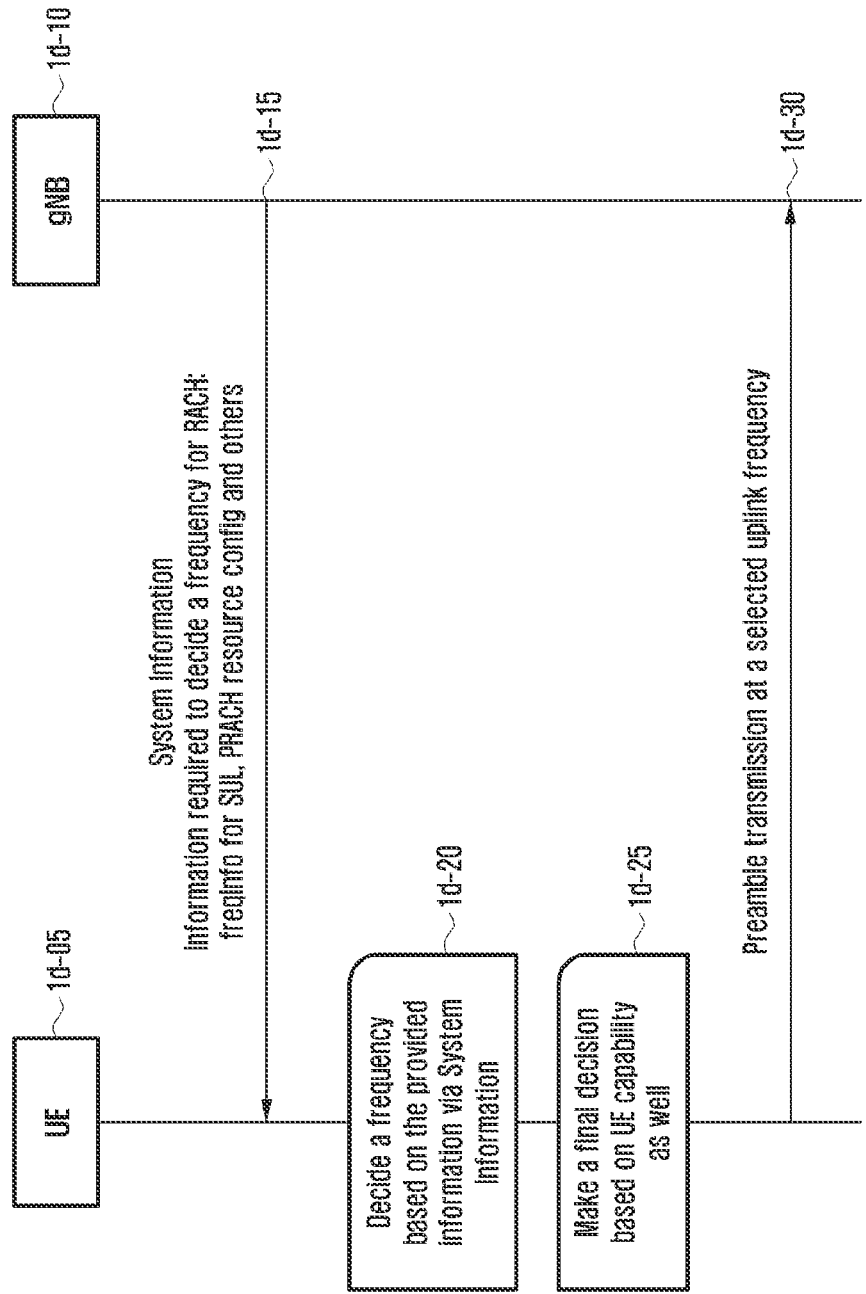
FIG. 1D is a diagram for describing a process in which a standby mode terminal selects one uplink frequency according to an embodiment of the disclosure.

FIG. 1D is a diagram for describing a process in which a standby mode terminal selects one uplink frequency according to an embodiment of the disclosure.

Referring to FIG. 1D, a base station 1d-10 transmits information required for selecting one of a plurality of uplinks and random access configuration information applied in each uplink to a terminal 1d-05 using the system information (1d-15). The random access configuration information includes radio resource information for the random access, information for calculating preamble transmission power, and preamble group information to be used for transmission.

The terminal receiving the information selects one of the uplink frequencies using the information (1d-20). In this case, the terminal considers even whether the selected frequency is supportable together and when the selected frequency is not supportable, the terminal selects another possible frequency (1d-25).

The terminal needs to select the uplink frequency that may provide the uplink service area. Therefore, the base station needs to provide required information so that the terminal may determine which uplink frequency may provide an appropriate service area. The method for configuring the above information is various. The disclosure proposes several methods.
First Method:
The base station provides a P_EMAX value corresponding to each uplink frequency as the system information. The P_EMAX is defined as below.
Maximum TX power level a UE may use when transmitting on the uplink in the cell (dBm)
The terminal receiving the value selects the uplink frequency providing the smallest value (P_EMAX−P_Power-Class) or selects one of the uplink frequencies with the value of (P_EMAX−P_PowerClass) not exceeding 0 according to a predetermined rule. The predetermined rule is proposed below again. The value of P_PowerClass is defined as follows.
Maximum radio frequency (RF) output power of the UE (dBm) according to the UE power class
Second Method:
The base station provides one signal strength value corresponding to each uplink frequency as the system information. The terminal receiving the value selects one of the uplink frequencies providing the signal strength value smaller than the P_PowerClass value thereof according to a predetermined rule.

There may be a plurality of uplink frequencies that may provide an appropriate uplink frequency domain. That is, in FIG. 1B, the plurality of uplink frequencies provides an appropriate service area to the second terminal 1b-45. Therefore, in this case, whether the service area may be provided is not important. When there are the plurality of uplink frequencies that may provide the appropriate uplink frequency domain, a method for the terminal to decide one uplink frequency is as follows.
First Method:
There may be uplink frequencies that may provide the appropriate uplink frequency domain, but a predetermined uplink frequency is selected. For example, in FIG. 1C, the next-generation mobile communication frequency is selected of the next generation mobile communication frequency 1c-05 of 3.5 GHz and the supplementary uplink frequency 1c-10 of 1.8 GHz.
Second Method:
One of the uplink frequencies that may provide the appropriate uplink frequency domain is randomly selected.
Third Method:
The base station provides one value between 0 and 1 as the system information. The terminal generates one random value between 0 and 1 and then selects one uplink frequency according to a value larger or smaller than the value provided from the base station.
Fourth Method:
The base station provides 10 bits of bitmap information corresponding to access classes (AC) 0 to 9 as the system information. In this case, a terminal corresponding to AC marked as 0 selects the next-generation mobile communication frequency and a terminal corresponding to AC marked as 1 selects the supplementary uplink frequency. The opposite is also valid.
Fifth Method:
The base station provides information indicating a congestion for each of the next-generation mobile communication frequency and the supplementary uplink frequency as the system information. Based on the information, the terminal selects one frequency with a low congestion.
Sixth Method:
The base station provides information indicating barring configuration information for each of the next-generation mobile communication frequency and the supplementary uplink frequency as the system information. Based on the barring configuration information, the terminal selects a frequency with a high access probability.
The terminal transmits the preamble when an access is required at the uplink frequency determined based on the above methods (1d-30).

Figure 1E:
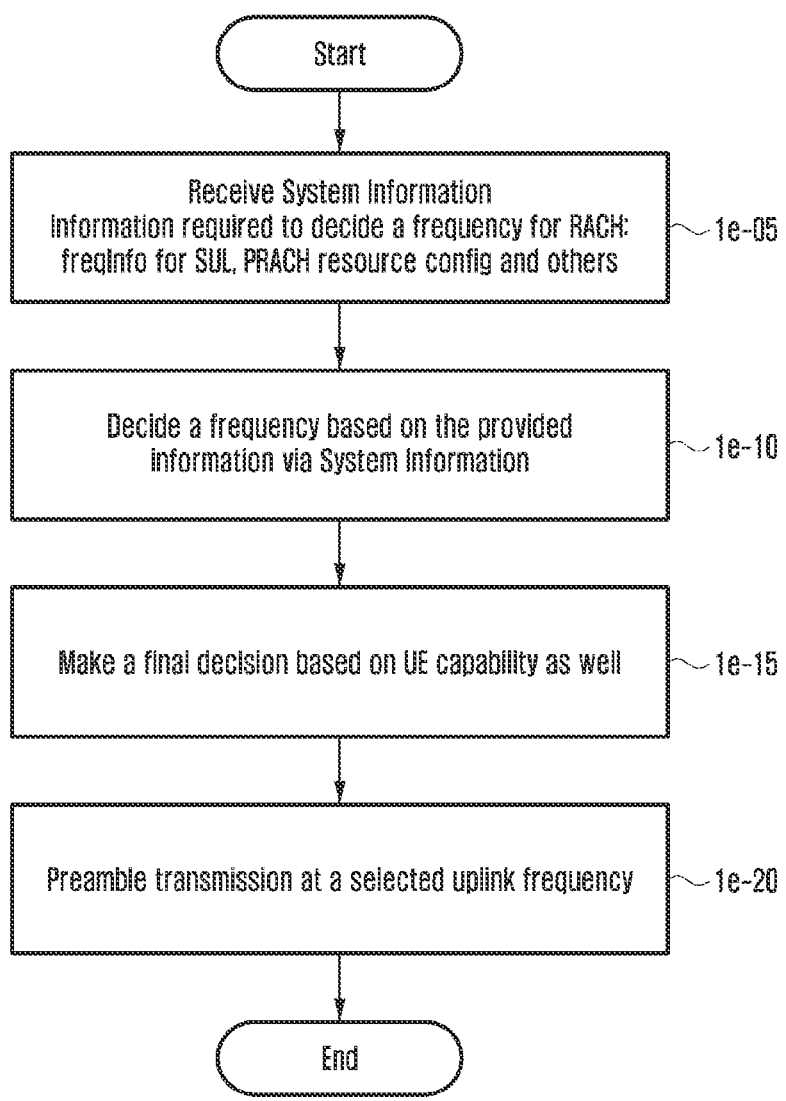
FIG. 1E is a flowchart of an operation in which a standby mode terminal selects one uplink frequency according to an embodiment of the disclosure.

FIG. 1E is a flowchart of an operation of selecting one uplink frequency by the standby mode terminal according to an embodiment of the disclosure.

Referring to FIG. 1E, in operation 1e-05, the terminal receives the system information from the base station. The system information includes information required for selecting one of a plurality of uplinks and random access configuration information applied in each uplink.

In operation 1e-10, the terminal selects one uplink frequency according to the provided information and a predetermined rule.

In operation 1e-15, the terminal determines whether the selected frequency is supportable to decide an uplink frequency to be finally used.

In operation 1e-20, the terminal transmits the preamble when the access is required using the selected uplink frequency.

Figure 1F:
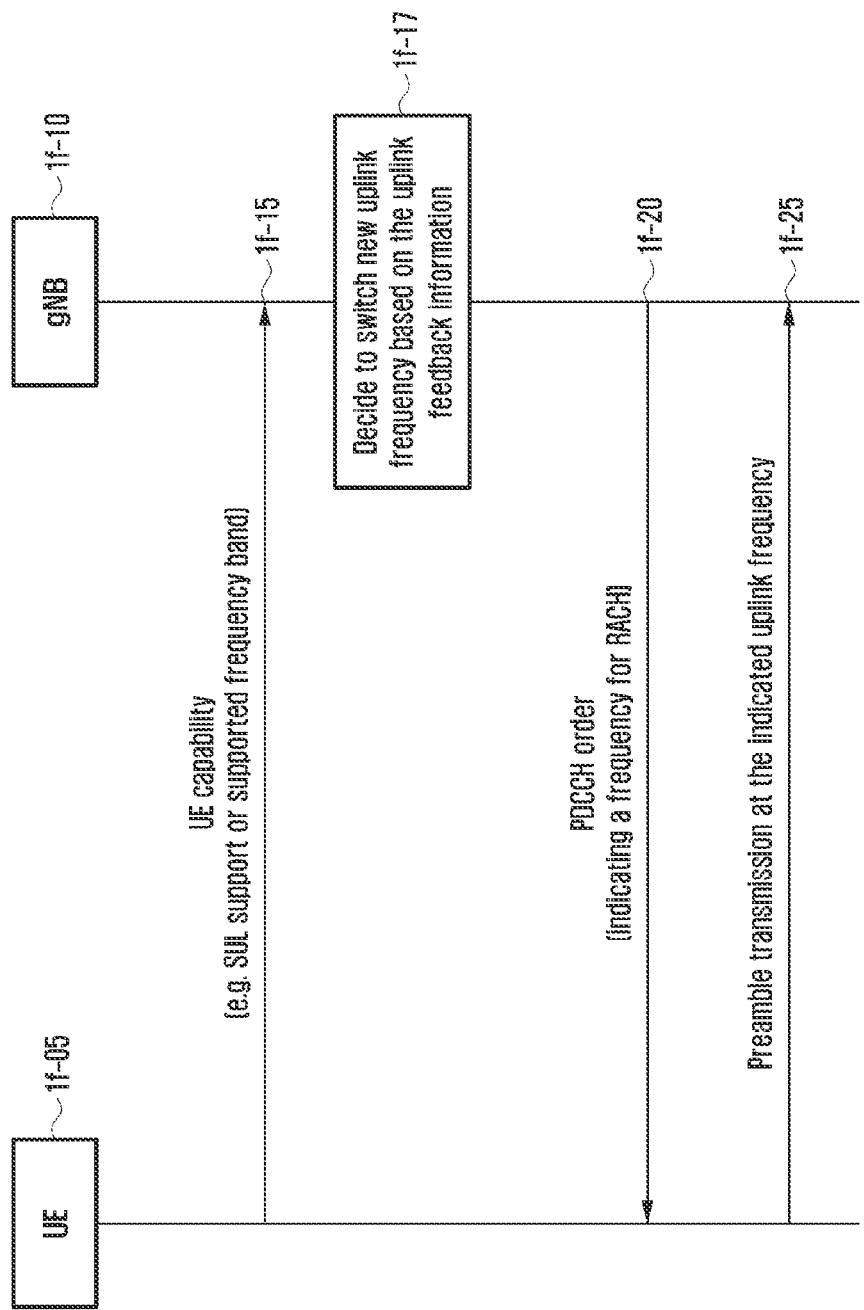
FIG. 1F is a diagram for describing a process in which a connection mode terminal selects one uplink frequency according to an embodiment of the disclosure.

FIG. 1F is a diagram for describing a process in which a connection mode terminal selects one uplink frequency according to an embodiment of the disclosure.

Referring to FIG. 1F, the uplink frequency decided in a standby mode is also used even in a connection mode. However, when the base station or the terminal makes a request during the connection mode, the case may be changed. A terminal 1f-05 transmits terminal capability information to a base station 1f-10 (1f-15). The capability information includes uplink frequency information that the terminal may support. Based on a feedback state in an uplink frequency which is currently used together with the information, the base station decides the uplink frequency to be changed (1f-17). The base station triggers the random access to the terminal using a physical downlink control channel (PDCCH) order. In this case, the PDCCH order includes uplink frequency information for performing the random access. This means changing to the uplink frequency. The uplink frequency information may be provided to the terminal using radio resource control (RRC) signaling or a medium access control (MAC) CE (1f-20). The terminal performs the random access to the indicated uplink frequency (1f-25). Thereafter, the frequency is used in uplink data transmission.

FIG. 1G is a diagram for describing a process of configuring one uplink frequency to a terminal that switches a connection mode to a standby mode or an INACTIVE mode according to an embodiment of the disclosure.

Referring to FIG. 1G, when the terminal is switched from the connection mode to the standby mode or the INACTIVE mode, the base station may dedicatedly indicate uplink frequency information which the terminal is to apply in the standby mode. A terminal 1g-05 transmits the terminal capability information to a base station 1g-10 (1g-15). The capability information includes uplink frequency information that the terminal may support. When the base station transmits a Release message for switching the terminal to the standby mode or the INACTIVE mode, the base station inserts the uplink frequency information to be applied in the standby mode or the INACTIVE mode in the message (1g-20). The terminal receiving the frequency information transmits the preamble at the indicated uplink frequency when the random access is required (1g-25).

The uplink frequency information indicated in the Release message is valid only until a specific condition is satisfied. For example, the Release message includes a specific timer value. The timer operates immediately after receiving the Release message or when the terminal receiving the message is switched to the standby mode or the INACTIVE mode. When the timer expires, the indicated uplink frequency information is no longer valid. Another method is that the indicated uplink frequency is no longer valid when the terminal is out of the service area of a cell providing the Release message. Alternatively, both methods may be applied at the same time.

Upon selecting the supplementary uplink frequency, the terminal transmits the preamble and msg3 at the frequency and receives RAR and msg4 from PCell.

Figure 1H:
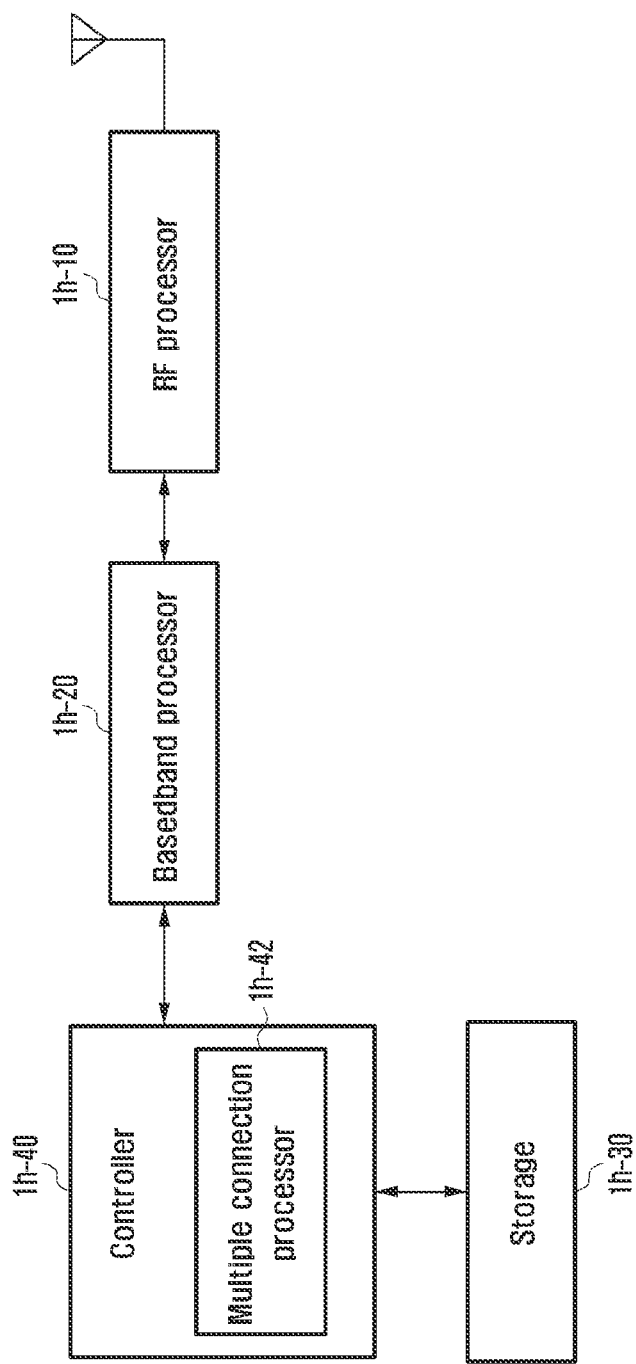
FIG. 1H is a block diagram illustrating an internal structure of a terminal according to an embodiment of the disclosure.
Figure 11:
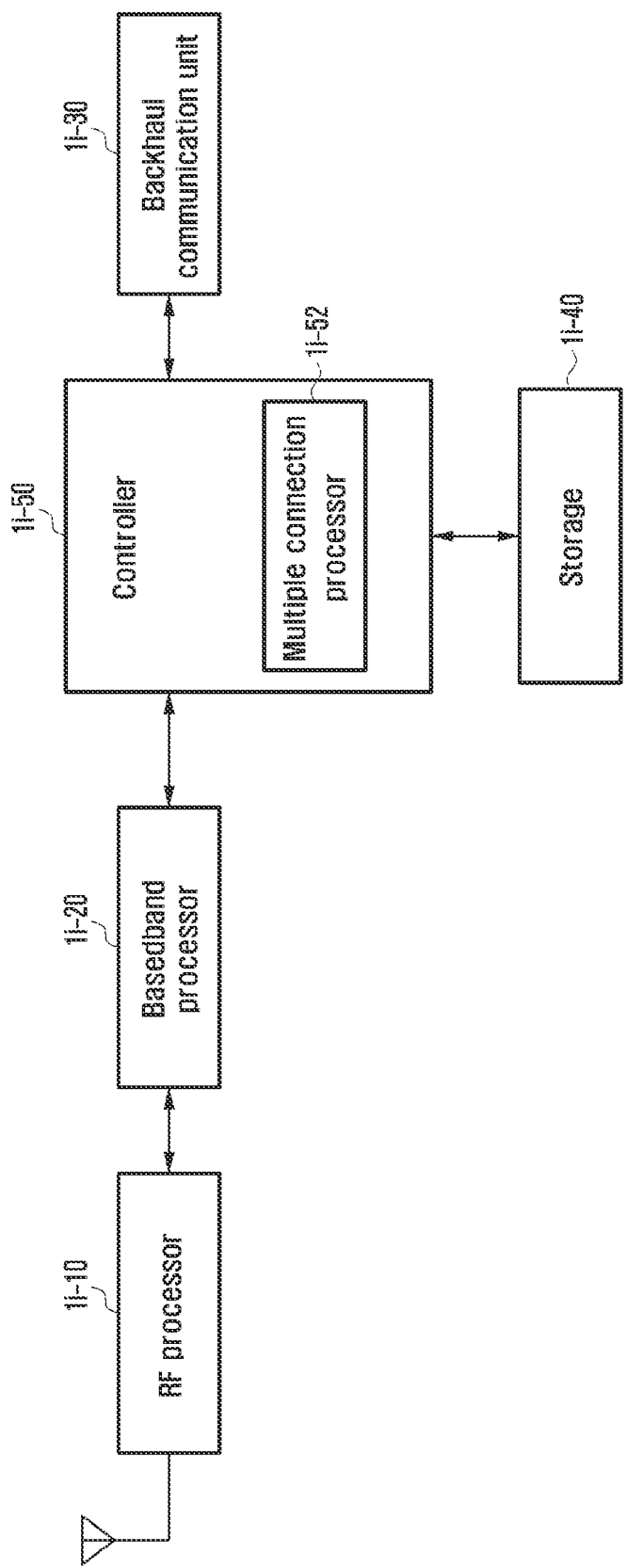

FIG. 1H illustrates the structure of the terminal according to an embodiment of the disclosure.

Referring to FIG. 1H, the terminal includes a RF processor 1h-10, a baseband processor 1h-20, a storage 1h-30, and a controller 1h-40.

The RF processor 1h-10 performs a function of transmitting and receiving a signal through a radio channel such as band conversion and amplification of the signal. That is, the RF processor 1h-10 up-converts a baseband signal provided from the baseband processor 1h-20 to an RF band signal and then transmits the RF band signal through an antenna and down-converts the RF band signal received through the antenna to the baseband signal. For example, the RF processor 1h-10 may include a transmission filter, a reception filter, an amplifier, a mixer, an oscillator, a digital to analog converter (DAC), an analog to digital converter (ADC), and the like. In the figure, only one antenna is illustrated, but the terminal may have multiple antennas. In addition, the RF processor 1h-10 may include multiple RF chains. Furthermore, the RF processor 1h-10 may perform beamforming. For the beamforming, the RF processor 1h-10 may adjust phases and sizes of signals transmitted and received through the multiple antennas or antenna elements. Further, the RF processor may perform multiple input multiple output (MIMO) and may receive multiple layers when performing a MIMO operation.

The baseband processor 1h-20 performs a conversion function between the baseband signal and a bitstream according to a physical layer specification of the system. For example, at the time of data transmission, the baseband processor 1h-20 generates complex symbols by encoding and modulating transmission bitstreams. In addition, upon receiving data, the baseband processor 1h-20 demodulates and decodes the baseband signal provided from the RF processor 1h-10 to restore the received bitstream. For example, when the data is transmitted according to an OFDM scheme, the baseband processor 1h-20 generates the complex symbols by encoding and modulating the transmission bit streams and maps the complex symbols to subcarriers and then configures OFDM symbols through an inverse fast Fourier transform (IFFT) operation and cyclic prefix (CP) insertion. In addition, upon receiving data, the baseband processor 1h-20 divides the baseband signal provided from the RF processor 1h-10 into OFDM symbol units and restores the signals mapped to the subcarriers through a fast Fourier transform (FFT) operation and then restores the received bitstreams through demodulation and decoding.

The baseband processor 1h-20 and the RF processor 1h-10 transmit and receive signals as described above. As a result, the baseband processor 1h-20 and the RF processor 1h-10 may be referred to as a transmitter, a receiver, a transceiver, or a communication unit. Further, at least one of the baseband processor 1h-20 and the RF processor 1h-10 may include multiple communication modules in order to support multiple different radio access technologies. In addition, at least one of the baseband processor 1h-20 and the RF processor 1h-10 may include different communication modules in order to process signals of different frequency bands. For example, the different radio access technologies may include a wireless local area network (LAN) (e.g., IEEE 802.11), a cellular network (e.g., LTE), and the like. In addition, the different frequency bands may include a super high frequency (SHF) band (e.g., 2.NRHz, NRhz) and a millimeter wave (e.g., 60 GHz) band.

The storage 1h-30 stores data such as a basic program, an application program, and configuration information for the operation of the terminal. In particular, the storage 1h-30 may store information related to a second access node performing wireless communication using a second radio access technology. In addition, the storage 1h-30 provides the stored data according to a request of the controller 1h-40.

The controller 1h-40 controls overall operations of the terminal. For example, the controller 1h-40 transmits and receives the signals through the baseband processor 1h-20 and the RF processor 1h-10. In addition, the controller 1h-40 writes and reads the data to and from the storage 1h-30. To this end, the controller 1h-40 may include at least one processor. For example, the controller 1h-40 may include a communication processor (CP) for performing a control for communication and an application processor (AP) for controlling a higher layer such as an application program. Further, the controller 1h-40 may include a multiple connection processor 1h-42 that performs processing for operating in a multiple connection mode.

FIG. 1I illustrates a block configuration of a main base station in wireless communication system according to an embodiment of the disclosure.

Referring to FIG. 1I, the base station is configured to include an RF processor 1i-10, a baseband processor 1i-20, a backhaul communication unit 1i-30, a storage 1i-40, and a controller 1i-50.

The RF processor 1i-10 performs a function of transmitting and receiving the signal through the radio channel such as the band conversion and amplification of the signal. That is, the RF processor 1h-10 up-converts the baseband signal provided from the baseband processor 1h-20 to the RF band signal and then transmits the RF band signal through the antenna and down-converts the RF band signal received through the antenna to the baseband signal. For example, the RF processor 1i-10 may include the transmission filter, the reception filter, the amplifier, the mixer, the oscillator, the DAC, the ADC, and the like. In the figure, only one antenna is illustrated, but the first access node may include multiple antennas. In addition, the RF processor 1i-10 may include multiple RF chains. Furthermore, the RF processor 1i-10 may perform the beamforming. For the beamforming, the RF processor 1i-10 may adjust the phases and sizes of the respective signals transmitted and received through the multiple antennas or antenna elements. The RF processor may perform a downlink MIMO operation by transmitting one or more layers.

The baseband processor 1i-20 performs the conversion function between the baseband signal and the bitstream according to the physical layer specification of the system. For example, at the time of data transmission, the baseband processor 1i-20 generates the complex symbols by encoding and modulating the transmission bitstreams. In addition, upon receiving data, the baseband processor 1i-20 demodulates and decodes the baseband signal provided from the RF processor 1i-10 to restore the received bitstream. For example, when the data is transmitted according to the OFDM scheme, the baseband processor 1i-20 generates the complex symbols by encoding and modulating the transmission bitstreams and maps the complex symbols to the subcarriers and then configures the OFDM symbols through the IFFT operation and the CP insertion. In addition, upon receiving data, the baseband processor 1i-20 divides the baseband signal provided from the RF processor 1i-10 into the OFDM symbol units and restores the signals mapped to the subcarriers through the FFT operation and then restores the received bitstreams through the demodulation and decoding. The baseband processor 1i-20 and the RF processor 1i-10 transmit and receive the signals as described above. As a result, the baseband processor 1i-20 and the RF processor 1i-10 may be referred to as the transmitter, the receiver, the transceiver, the communication unit, or a wireless communication unit.

The backhaul communication unit 1i-30 provides an interface for performing communication with other nodes in a network. That is, the backhaul communication unit 1i-30 converts bitstreams transmitted from the main base station to other nodes, for example, a sub-base station, a CN, etc., into a physical signal and converts the physical signal received from the other node into the bitstream.

The storage 1i-40 stores the data such as the basic program, the application program, and the configuration information for the operation of the terminal. In particular, the storage 1i-40 may store information on a bearer allocated to the connected terminal, a measurement results reported from the connected terminal, and the like. In addition, the storage 1i-40 may store information serving as a criterion for determining whether to provide multiple connections to the terminal or whether to suspend the multiple connections. Further, the storage 1i-40 provides the stored data according to the request of the controller 1i-50.

The controller 1i-50 controls the overall operations of the main base station. For example, the controller 1i-50 transmits and receives the signals through the baseband processor 1i-20 and the RF processor 1i-10 or the backhaul communication unit 1i-30. In addition, the controller 1i-50 writes and reads the data to and from the storage 1i-40. To this end, the controller 1i-50 may include at least one processor. Further, the controller 1i-50 may include a multiple connection processor 1i-52 that performs processing for operating in a multiple connection mode.

Second Embodiment

Hereinafter, an operation principle of the disclosure will be described in detail with reference to the accompanying drawings. Hereinbelow, in describing the disclosure, detailed description of associated known function or constitutions will be omitted if it is determined that they unnecessarily make the gist of the disclosure unclear. In addition, terms to be described below as terms which are defined in consideration of functions in the disclosure may vary depending on the intention or usual practice of a user or an operator. Accordingly, the terms need to be defined based on contents throughout this specification.

A term used for identifying a connection node used in the following description, a term referring to network entities, a term referring to messages, a term indicating an interface between network objects, a term indicating various identification information, etc. are illustrated for convenience of description. Therefore, the disclosure is not limited to terms to be described later, and other terms referring to objects having equivalent technical meanings can be used.

Hereinafter, for convenience of description, in the disclosure, used are terms and names defined in the 3rd generation partnership project long term evolution (3GPP LTE) standard which is the latest standard among existing communication standards. However, the disclosure is not limited by the above-mentioned terms and names, and can be equally applied to systems conforming to other standards. In particular, the disclosure is applicable to 3GPP new ratio (NR: 5th generation mobile communication standard).

Figure 2A:
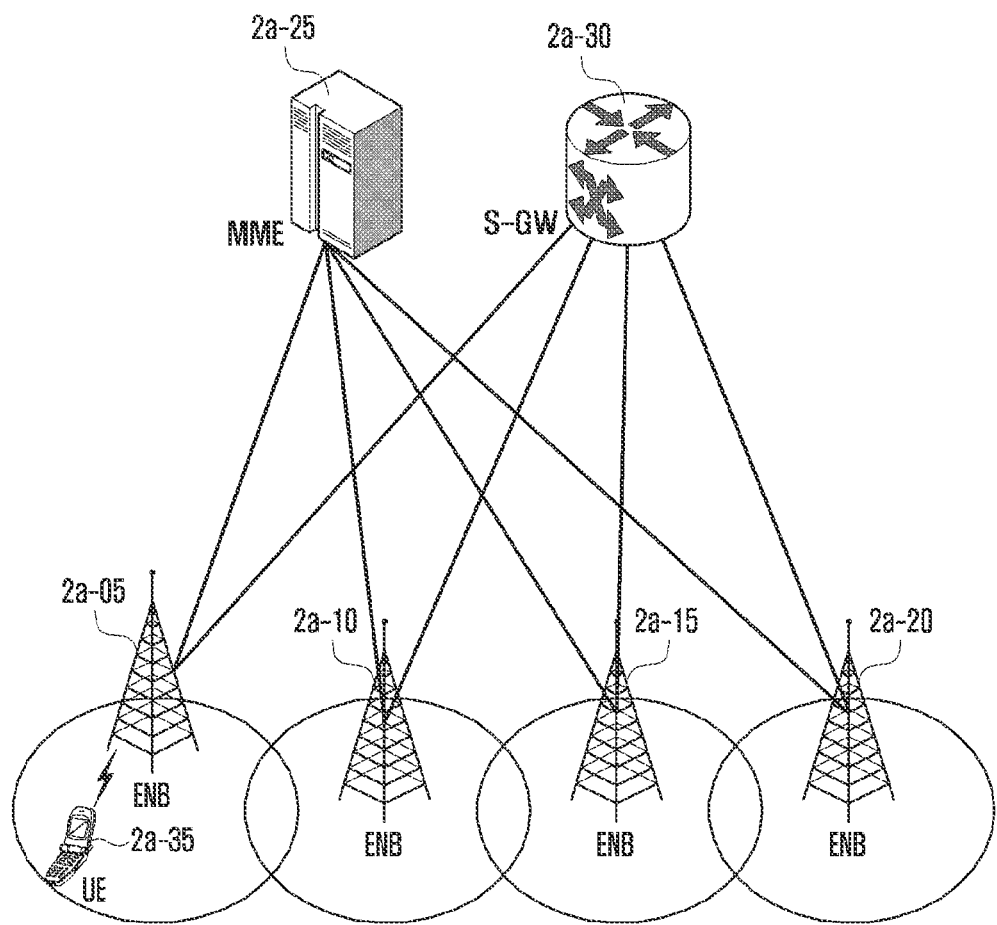
FIG. 2A is a diagram illustrating a structure of a long term evolution (LTE) system according to an embodiment of the disclosure.

FIG. 2A is a diagram illustrating a structure of an LTE system according to an embodiment of the disclosure.

Referring to FIG. 2A above, the wireless communication system includes multiple base stations 2a-05, 2a-10, 2a-15, and 2a-20, an MME 2a-25, and a serving-gateway (S-GW) 2a-30. A UE or terminal 2a-35 is connected to an external network through the base stations 2a-05, 2a-10, 2a-15, and 2a-20, and the S-GW 2a-30.

The base stations 2a-05, 2a-10, 2a-15, and 2a-20 provide the radio access to terminals connected to the network as access nodes of a cellular network. That is, in order to serve traffic of users, the base stations 2a-05, 2a-10, 2a-15, and 2a-20 collect and schedule the state information such as the buffer state, the available transmission power state, and the channel state to support the connection between the terminals and a CN. The MME 2a-25 as a device for performing various control functions as well as the mobility management function for the terminal, and is connected to multiple base stations and the S-GW 2a-30 provides a data bearer. Further, the MME 2a-25 and the S-GW 2a-30 may further perform authentication and bearer management for the terminal connected to the network and process packets which are reached from the base stations 2a-05, 2a-10, 2a-15, and 2a-20 or packets to be transmitted to the base stations 2a-05, 2a-10, 2a-15, and 2a-20.

Figure 2B:
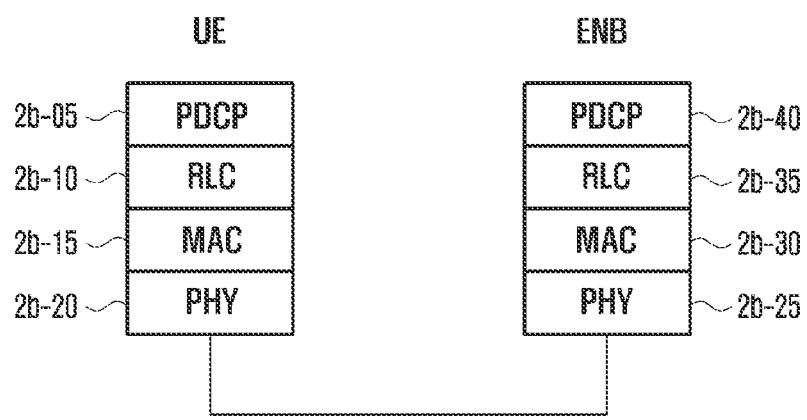
FIG. 2B is a diagram illustrating a radio protocol structure of an LTE system according to an embodiment of the disclosure.

FIG. 2B is a diagram illustrating a radio protocol structure of the LTE system according to an embodiment of the disclosure. The NR to be defined in the future may be partially different from a radio protocol structure in this figure, but will be described for convenience of description of the disclosure.

Referring to FIG. 2B, the radio protocol of the LTE system includes packet data convergence protocols (PDCPs) 2b-05 and 2b-40, radio link controls (RLCs) 2b-10 and 2b-35, and MACs 2b-15 and 2b-30 in each of the terminal and eNB. The PDCPs 2b-05 and 2b-40 are responsible for operations such as IP header compression/decompression and the RLCs 2b-10 and 2b-35 reconfigures the PDCP packet data unit (PDU) reconfigure PDCP PDU to an appropriate size. The MACs 2b-15 and 2b-30 are connected to multiple RLC layer devices configured in one terminal and perform operations of multiplexing the RLC PDUs to the MAC PDUs and demultiplexing the RLC PDUs from the MAC PDUs. The physical layer 2b-20 and 2b-25 channel-code and modulate the higher layer data and convert the higher layer data into the OFDM symbol and transmit the OFDM symbol through the radio channel or demodulate and channel-decode the OFDM symbol received through the radio channel and transmit the OFDM symbol to the higher layer. Further, even in the physical layer, for additional error correction, hybrid ARQ (HARQ) is used and a receiving side transmits whether to receive a packet transmitted by a transmitting side as 1 bit. This is referred to as HARQ acknowledgement (ACK)/negative acknowledgement (NACK) information. Downlink HARQ ACK/NACK information for uplink transmission may be transmitted through a physical hybrid-ARQ indicator channel (PHICH) physical channel and uplink HARQ ACK/NACK information for downlink transmission may be transmitted through a physical uplink control channel (PUCCH) or a physical uplink shared channel (PUSCH) physical channel. The PUSCH is used for the terminal to transmit to the base station downlink channel status information (CSI), a scheduling request (SR), and the like as well as the HARQ ACK/NACK information. The SR is 1-bit information and when the terminal transmits the SR to a resource in a PUCCH configured by the base station, the base station recognizes that the corresponding terminal has data to be transmitted in the uplink and allocates an uplink resource. The terminal may transmit a detailed buffer status report (BSR) message as the uplink resource. The base station may allocate a plurality of SR resources to one terminal.

Meanwhile, the physical (PHY) layer may be constituted by one or a plurality of frequencies/carriers and technology of simultaneously configuring and using the plurality of frequencies in one base station is referred to as carrier aggregation (CA). The CA technology is a technique in which unlike a case where only one carrier is used for communication between the terminal (UE) and the base station (E-UTRAN NodeB (eNB)), a transmission amount may be dramatically increased as many as secondary carriers by additionally using a primary carrier and one or a plurality of secondary carriers. Meanwhile, In LTE, a cell in the base station using the primary carrier is called primary cell (PCell) and a secondary carrier is called secondary cell (SCell). Technology in which the CA function is extended to two base stations is referred to as dual connectivity (DC). In the DC technology, the terminal concurrently connects a master base station (Master E-UTRAN NodeB (MeNB)) and a secondary base station (secondary E-UTRAN NodeB (SeNB) (MCG)) and cells belonging to the MeNB are referred to as a master cell group (MCG) and cells belonging to the SeNB are referred to as a secondary cell group (SCG). There is a representative cell for each cell group and a representative cell of the MCG is referred to as a PCell and a representative cell of the SCG is referred to as a primary secondary cell (PSCell). When using the aforementioned NR, the MCG is used as the LTE technology and the SCG is used as the NR, and as a result, the terminal may use both the LTE and the NR.

Although not illustrated in the figure, an RRC layer exist in a higher layer of the PDCP layer of each of the terminal and the base station and the RRC layer may transmit and receive connection and measurement related control messages for RRC. For example, a measurement may be instructed to the terminal using an RRC layer message and the terminal may report a measurement result to the base station using the RRC layer message.

Meanwhile, the transmission units of the PCell and the SCell may be the same or different. For example, in the LTE, the transmission units of the PCell and the SCell may be the same in 1 ms unit, but in the NR, the transmission unit (slot) in the PCell is 1 ms, but the transmission unit in the SCell may have a length of 0.5 ms.

Table 1 below shows information on the length of the slot available in each serving cell (i.e., PCell or SCell) according to numerology (or according to a subcarrier interval) used by each serving cell in the NR.

TABLE 1

| | Secondary carrier interval (kHz) | | | | |
|---|---|---|---|---|---|
| | 15 | 30 | 60 | 120 | 240 |
| Transmission unit (slot) length (ms) | 1 | 0.5 | 0.25 | 0.125 | 0.00625 |
| Number of slots in subframe (1 ms) | 1 | 2 | 4 | 8 | 12 |

Further, in the LTE and the NR, the following units are used in a frame structure in a radio interval (i.e., between the base station and the terminal).

Radio frame: Having a length of 1 ms and identified by system frame number (SFN) every radio frame Subframe: Having the length of 1 ms and having 10 subframes in the radio frame. Identified by subframe numbers 0 to 9 in every radio frame Slot: Having a length depending on a set value as shown in the table and a transmission unit when the base station and the terminal transmit data.

Figure 2C:
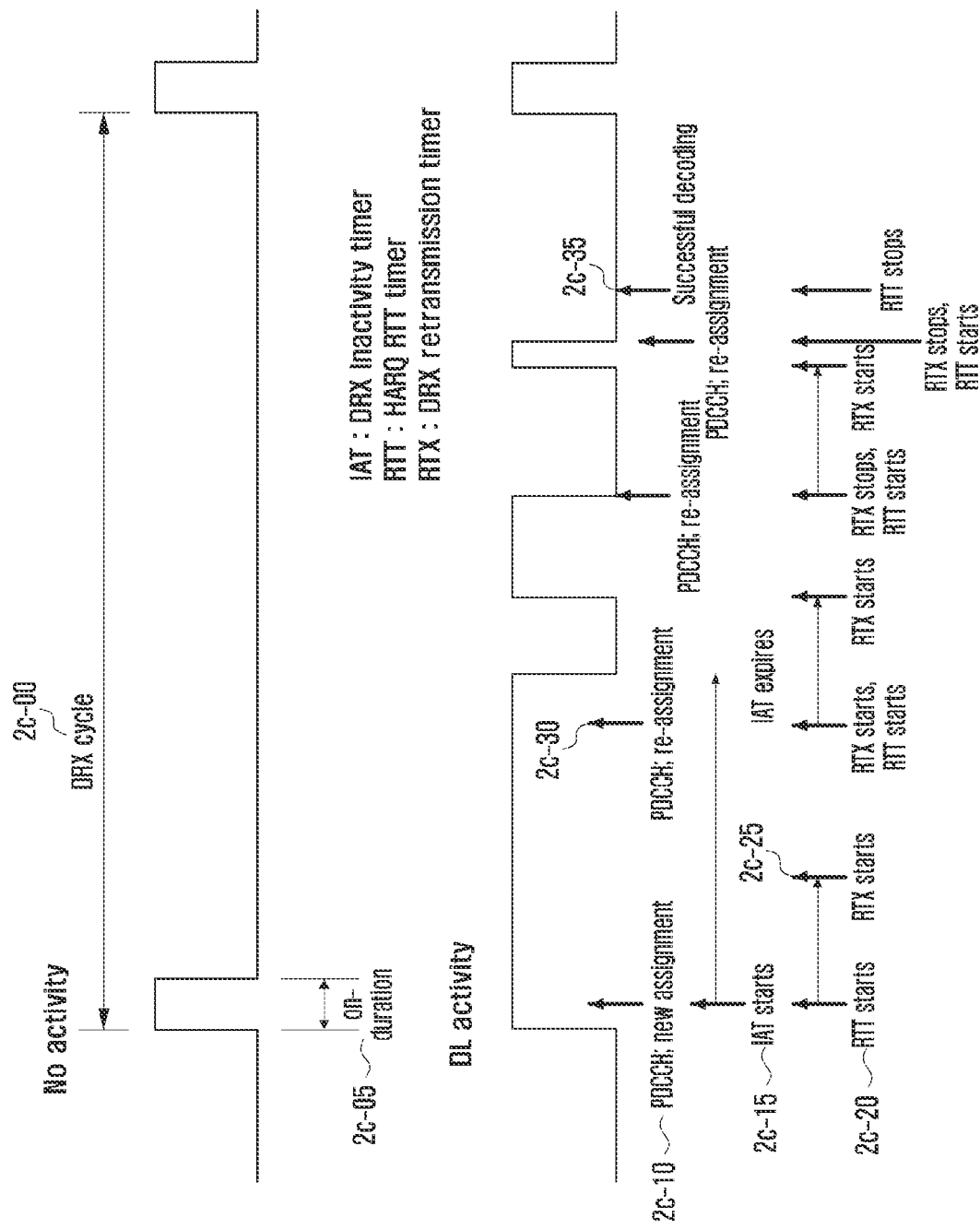
FIG. 2C is a diagram illustrating an embodiment in which a timing of performing a discontinuous reception (DRX) operation is schematized in a situation where a plurality of transmission units coexists according to an embodiment of the disclosure.

FIG. 2C is a diagram for describing a discontinuous reception DRX operation of the terminal according to an embodiment of the disclosure.

Referring to FIG. 2C, DRX is a technique that monitors only some PDCCHs according to the configuration information instead of monitoring all physical downlink control channels (PDCCH) in order to obtain scheduling information according to the configuration of the base station for minimizing the power consumption of the terminal. A basic DRX operation has a DRX period (2c-00) and monitors the PDCCH only for onDuration (2c-05) time. In the connection mode, the DRX period has two values, long DRX and short DRX. In general, a long DRX period is applied and if necessary, the base station may additionally set the short DRX period. When both the long DRX period and the short DRX period are set, the terminal starts a short DRX timer and first repeats the short DRX cycle and when there is no new traffic until the short DRX timer expires, the terminal changes the short DRX period to the long DRX period. When the scheduling information for a new packet is received by the PDCCH during the on-duration (2c-05) time (2c-10), the terminal starts a DRX inactivity timer 2c-15. The terminal maintains an active state during the DRX inactivity timer. That is, PDCCH monitoring is continued. Further, an HARQ RTT timer 2c-20 also starts. The HARQ RTT timer is applied to prevent the terminal from unnecessarily monitoring the PDCCH during HARQ round trip time (RTT) and the terminal does not need to perform the PDCCH monitoring during a timer operation time. However, while the DRX inactivity timer and the HARQ RTT timer operate simultaneously, the terminal continues to monitor the PDCCH based on the DRX inactivity timer. When the HARQ RTT timer expires, the DRX retransmission timer 2c-25 starts. While the DRX retransmission timer operates, the terminal needs to perform the PDCCH monitoring. In general, during the DRX retransmission timer operation, scheduling information for HARQ retransmission is received (2c-30). Upon receiving the scheduling information, the terminal immediately stops the DRX retransmission timer and starts the HARQ RTT timer again. Such an operation is continued until the packet is successfully received (2c-35).

Figure 2D:
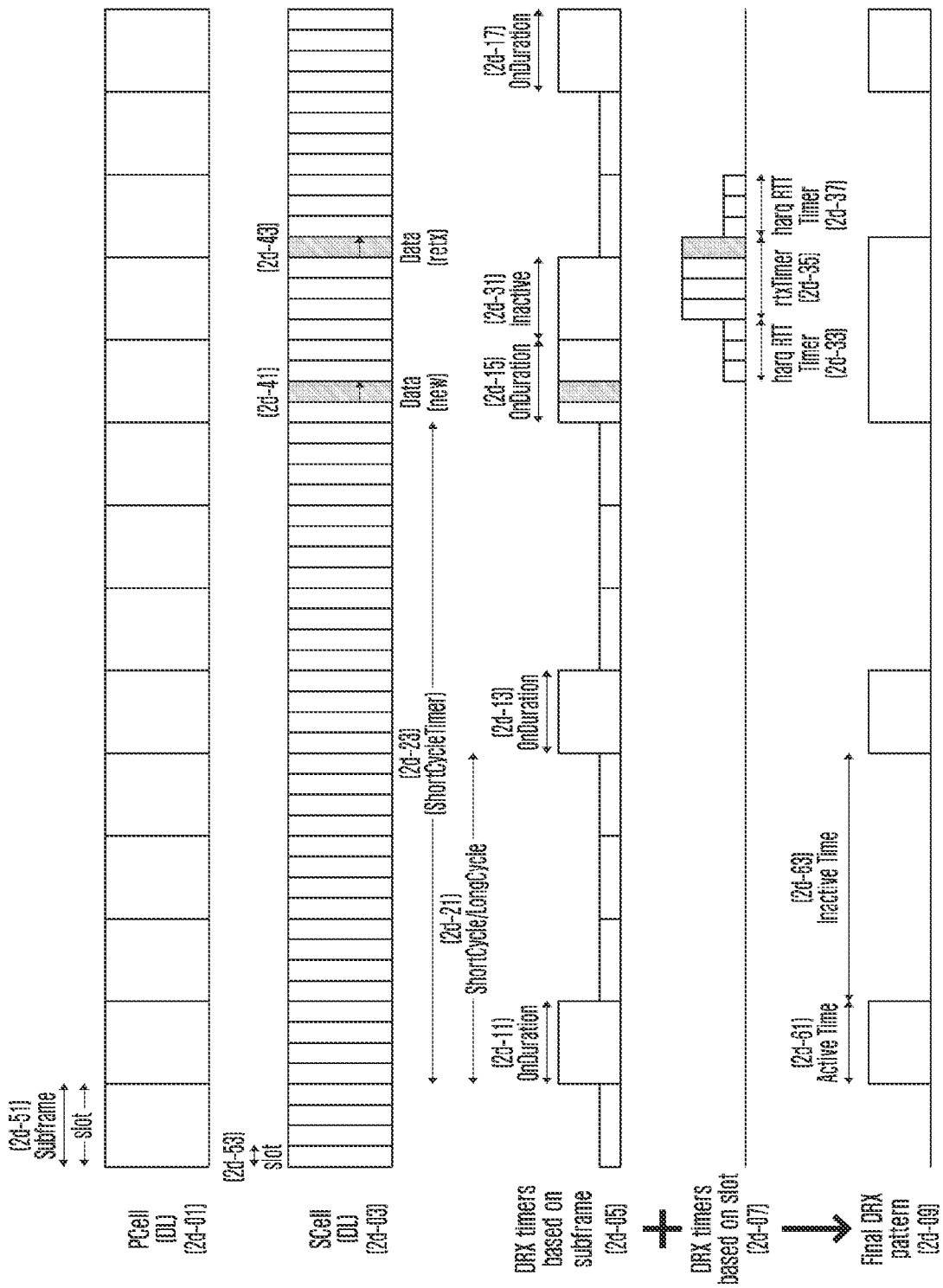
FIG. 2D is a diagram illustrating an embodiment in which a timing of performing a DRX operation is schematized in a situation where the plurality of transmission units coexists according to an embodiment of the disclosure.

FIG. 2D is a diagram illustrating an embodiment in which a timing of performing a DRX operation is schematized in the situation where the plurality of transmission units coexists according to an embodiment of the disclosure.

Referring to FIG. 2D, it is assumed that the terminal is in the connection mode (RRC_CONNECTED) state in which the terminal is connected to the base station and SCell 2d-03 is additionally configured from the base station. The terminal in the connection mode state may transmit and receive data to and from the base station.

When the base station configures SCell to the terminal, the base station configures the transmission unit of the corresponding SCell. The transmission unit is generally referred to as a slot in the disclosure. In the example diagram, it is assumed that the slot length of the PCell (2d-01) has a length of 1 ms as in the case of the subframe (2d-51) and the slot length of the SCell has a length of ¼ (0.25 ms) (2d-53).

Meanwhile, the base station may configure the DRX to reduce the power consumption of the terminal. The timer used for the DRX includes the following timers as described above and the time unit for each timer is as follows. According to the present invention, onDuration timer (2d-11) is operated based on subframe unit (2d-05) and HARQ RTT timer (2d-33, 2d-37) and rtx timer (2d-35) are operated based on slot unit (2d-07).

onDuration timer: Set to the number of slots in the reference cell short DRX cycle: set to the number of slots in the reference cell (or set to the number of subframes)

short DRX cycle timer (2d-23): set to the number of slots in the reference cell long DRX cycle: set to the number of slots in the reference cell (or set to the number of subframes)

DRX inactivity timer: set to the number of slots in the reference cell

HARQ RTT timer: set to the number of slots in the corresponding cell in which transmission/retransmission is performed DRX retransmission timer: set to the number of slots in the corresponding cell in which transmission/retransmission is performed The slot of the reference cell may be the slot of the PCell or the slot of a cell having the longest transmission unit among all serving cells (i.e., PCell and SCell).

The terminal that receives the configuration repeats the corresponding cycle according to the configured cycle 2d-21 and monitors the PDCCH during onDuration (2d-11), (2d-13), (2d-15), and (2d-17). When the base station transmits data to the terminal during the onDuration (2d-41), the terminal drives the HARQ RTT timer and the time unit at this time is based on the number of slots 2d-53 of the serving cell 2d-03 subjected to scheduling. In the example diagram, the time unit of the HARQ RTT timer is assumed as 3 serving cell slots (2d-33). Since the data is received during the onDuration, the terminal drives the DRX inactivity timer (2d-31) to determine whether additional new data is coming. Meanwhile, when the HARQ RTT timer expires, the terminal drives a DRX retransmission timer and the terminal monitors the PDCCH while the DRX retransmission timer is driven (2d-35). When the terminal receives the scheduling for retransmission on the PDCCH (2d-43), the terminal stops the DRX retransmission timer that was being driven and then drives the HARQ RTT timer (2d-37). Thereafter, when the terminal determines that the HARQ retransmission has been successfully completed before the HARQ RTT timer expires, the terminal does not operate the DRX retransmission timer any more. As illustrated, the HARQ RTT timer and the DRX retransmission timer associated with the HARQ retransmission are driven according a set length in the slot unit of the corresponding cell in which transmission and retransmission are performed, thereby performing retransmission according to each transmission unit.

When an active time 2d-61 and an inactive time 2d-63 at which the terminal substantially monitors the PDCCH and transmits and receives the data according to the driving of all timers are schematically illustrated, a pattern of 2d-09 is shown.

Figure 2E:
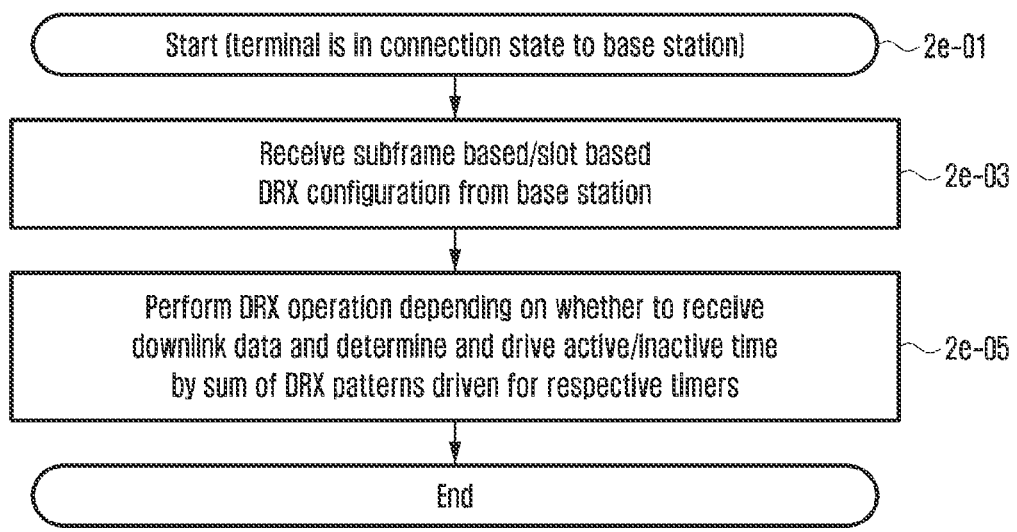
FIG. 2E is a diagram illustrating an operational order of a terminal at the time of performing a DRX operation in a situation where a plurality of transmission units coexists according to an embodiment of the disclosure.

FIG. 2E is a diagram illustrating an operational order of a terminal at the time of performing the DRX operation in the situation where the plurality of transmission units coexists according to an embodiment of the disclosure.

Referring to FIG. 2E, it is assumed that the terminal is in the connection mode (RRC_CONNECTED) state in which the terminal is connected to the base station (2e-01). Thereafter, the terminal receives the DRX configuration from the base station (2e-03). The DRX configuration includes timers required for DRX driving and the respective timers and the time units of the respective timers are as follows.

onDuration timer: set to the number of slots in the reference cell short DRX cycle: set to the number of slots in the reference cell (or set to the number of subframes)

short DRX cycle timer: set to the number of slots in the reference cell long DRX cycle: set to the number of slots in the reference cell (or set to the number of subframes)

DRX inactivity timer: set to the number of slots in the reference cell

HARQ RTT timer: set to the number of slots in the corresponding cell in which transmission/retransmission is performed DRX retransmission timer: set to the number of slots in the corresponding cell in which transmission/retransmission is performed The slot of the reference cell may be the slot of the PCell or the slot of a cell having the longest transmission unit among all serving cells (i.e., PCell and SCell).

Accordingly, the terminal repeats the cycle according to the configured cycle and monitors the PDCCH during onDuration. When there is new data transmission in onDuration, the DRX inactivity timer is driven at the end of onDuration and the HARQ RTT timer is driven at the time of receiving the new data transmission. When the terminal receives the new data transmission in the active time interval, the terminal performs the above operation. In addition, when the HARQ RTT timer does not successfully receive the packet until the expiration of the HARQ RTT timer, the terminal drives the DRX retransmission timer and monitors the PDCCH for retransmission from the base station. Thereafter, when the terminal determines that the HARQ retransmission is successfully completed before the HARQ RTT timer expires, the terminal does not drive the DRX retransmission timer any more. When both the long DRX period and the short DRX period are set as described above, the terminal starts the short DRX timer and first repeats the short DRX period and when there is no new traffic until the short DRX timer expires, the terminal changes the short DRX period to the long DRX period. Thereafter, when new traffic occurs, the terminal uses the short DRX period and repeats the above procedure (2e-05).

Figure 2F:
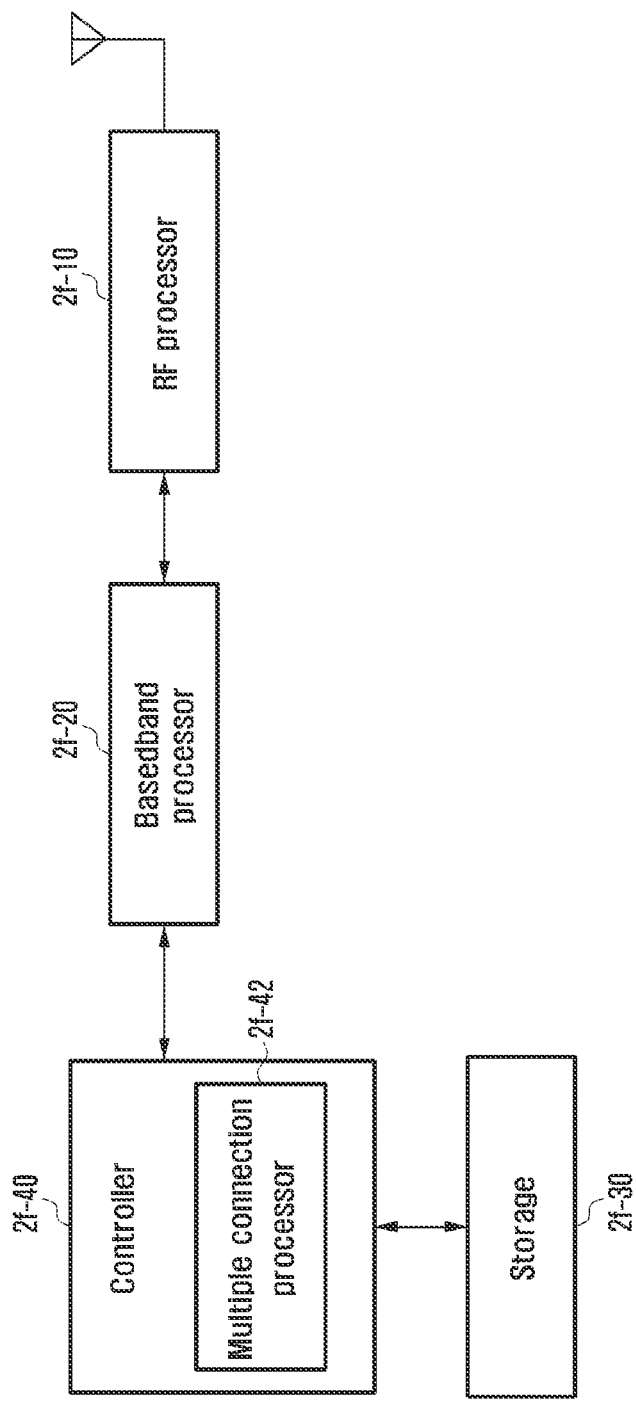
FIG. 2F is a block diagram of a terminal according to an embodiment of the disclosure.

FIG. 2F is a block diagram of a terminal according to an embodiment of the disclosure.

Referring to FIG. 2F above, the terminal includes a RF processor 2f-10, a baseband processor 2f-20, a storage 2f-30, and a controller 2f-40.

The RF processor 2f-10 performs a function of transmitting and receiving a signal through a radio channel such as band conversion and amplification of the signal. That is, the RF processor 2f-10 up-converts the baseband signal provided from the baseband processor 2f-20 to the RF band signal and then transmits the RF band signal through the antenna and down-converts the RF band signal received through the antenna to the baseband signal. For example, the RF processor 2f-10 may include a transmission filter, a reception filter, an amplifier, a mixer, an oscillator, a DAC, an ADC, and the like. In FIG. 2F above, only one antenna is illustrated, but the terminal may have multiple antennas. In addition, the RF processor 2f-10 may include multiple RF chains. Furthermore, the RF processor 2f-10 may perform beamforming. For the beamforming, the RF processor 2f-10 may adjust phases and sizes of signals transmitted and received through the multiple antennas or antenna elements.

The baseband processor 2f-20 performs a conversion function between the baseband signal and a bit string according to a physical layer specification of the system. For example, at the time of data transmission, the baseband processor 2f-20 generates the complex symbols by encoding and modulating the transmission bitstreams. In addition, upon receiving data, the baseband processor 2f-20 demodulates and decodes the baseband signal provided from the RF processor 2f-10 to restore the received bitstream. For example, when the data is transmitted according to an OFDM scheme, the baseband processor 2f-20 generates the complex symbols by encoding and modulating the transmission bit streams and maps the complex symbols to subcarriers and then configures OFDM symbols through an IFFT operation and CP insertion. In addition, upon receiving data, the baseband processor 2f-20 divides the baseband signal provided from the RF processor 2f-10 into OFDM symbol units and restores the signals mapped to the subcarriers through a FFT operation and then restores the received bitstreams through demodulation and decoding.

The baseband processor 2f-20 performs a function of converting a baseband signal and a bit string according to a physical layer specification of the system. For example, at the time of data transmission, the baseband processor 2f-20 generates complex symbols by encoding and modulating transmission bit streams. Also, upon receiving data, the baseband processor 2f-20 demodulates and decodes the baseband signal provided from the RF processor 2f-10 to recover the received bitstream. For example, in accordance with an OFDM scheme, the baseband processor 2f-20 generates complex symbols by encoding and modulating transmission bit streams, transmits the complex symbols to subcarriers, and then constructs OFDM symbols through IFFT operation and CP insertion. When receiving the data, the baseband processor 2f-20 divides the baseband signal provided from the RF processor 2f-10 into OFDM symbol units, performs FFT operation on subcarriers, restores the mapped signals, and restores the received bit stream through demodulation and decoding.

The baseband processor 2f-20 and the RF processor 2f-10 transmit and receive the signals as described above. As a result, the baseband processor 2f-20 and the RF processor 2f-10 may be referred to as a transmitter, a receiver, a transceiver, or a communication unit. In addition, at least one of the baseband processor 2f-20 and the RF processor 2f-10 may include different communication modules in order to process signals of different frequency bands. In addition, the different frequency bands may include a super high frequency (SHF) band (e.g., 2.5 GHz and 5 GHz) and a millimeter wave (e.g., 60 GHz) band.

The storage 2f-30 stores data such as a basic program, an application program, and configuration information for the operation of the terminal.

The controller 2f-40 controls overall operations of the terminal. For example, the controller 2f-40 transmits and receives the signals through the baseband processor 2f-20 and the RF processor 2f-10. In addition, the controller 2f-40 writes and reads the data to and from the storage 2f-30. To this end, the controller 2f-40 may include at least one processor. For example, the controller 2f-40 may include a CP for performing a control for communication and an AP for controlling a higher layer such as an application program. According to an embodiment of the disclosure, the controller 2f-40 includes a multiple connection processor 2f-42 for performing a process for operating in a multiple connection mode. For example, the controller 2f-40 may control the terminal to perform the procedure shown in the operation of the terminal illustrated in FIG. 2F above.

Third Embodiment

Hereinafter, an operation principle of the disclosure is described in detail with reference to the accompanying drawings. In describing the disclosure, a detailed description of a related known function or configuration will be omitted if it is deemed to make the gist of the disclosure unnecessarily vague. Furthermore, terms to be described hereunder have been defined by taking into consideration functions in the disclosure, and may be different depending on a user, an operator's intention or practice. Accordingly, each term should be defined based on contents over the entire specification.

In the following description, a term to identify an access node, a term to denote network entities, a term to denote messages, a term to denote an interface between network entities, and a term to denote a variety of types of identity information have been illustrated for convenience of description. Accordingly, the disclosure is not limited to the following terms, and other terms to denote targets having equivalent technical meanings may be used.

For convenience in explanation, in the disclosure, terms and names defined in the 3rd Generation Partnership Project Long Term Evolution (3GPP LTE) standards, being the latest standards among the currently existing communication standards, are used. However, the disclosure is not restricted by the terms and names, and it may be equally applied to systems complying with other standards. In particular, the disclosure may be applied to 3GPP New Radio (NR: $5^{th}$ generation mobile communication standards).

Figure 3A:
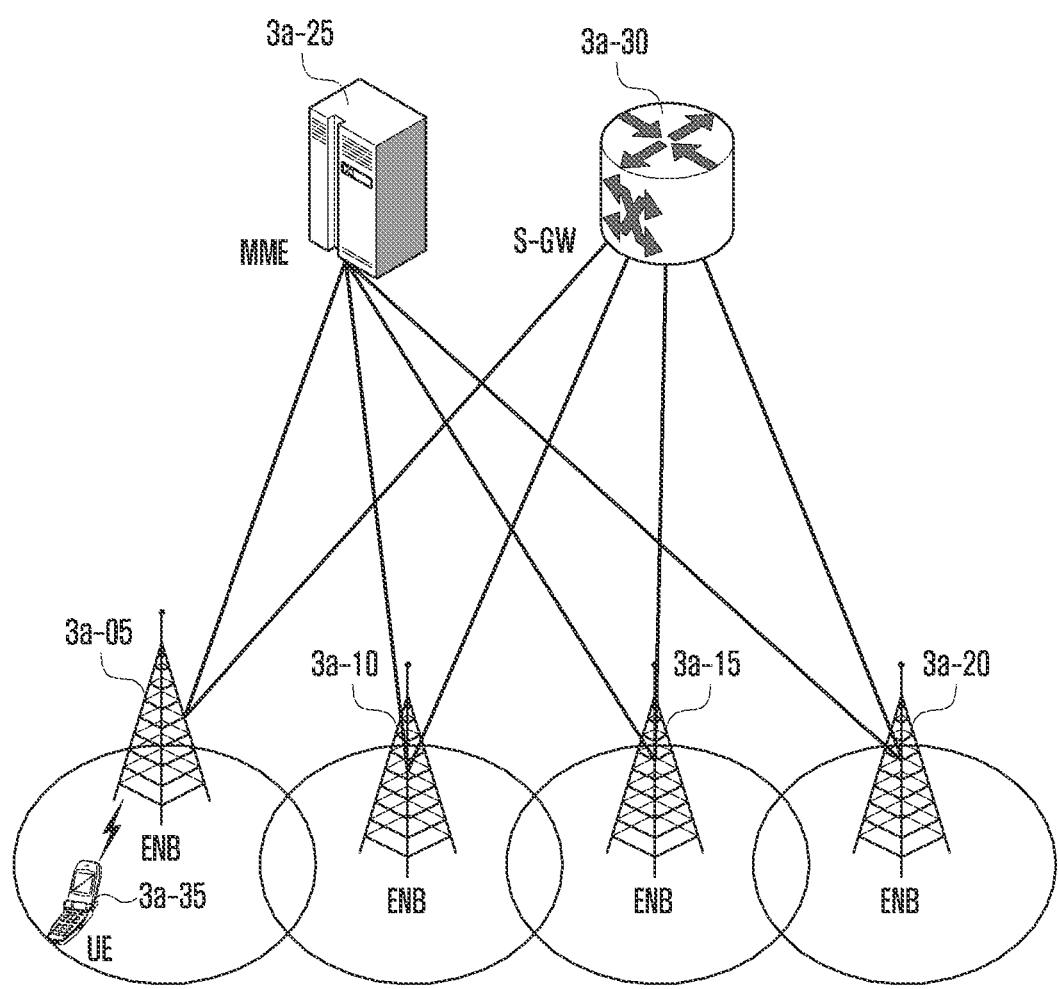
FIG. 3A is a diagram illustrating the structure of an LTE system for reference in explaining the disclosure.

FIG. 3A is a diagram illustrating the structure of an LTE system for reference in explaining the disclosure.

Referring to FIG. 3A, a wireless communication system is composed of several base stations 3a-05, 3a-10, 3a-15, and 3a-20, a mobility management entity (MME) 3a-25, and a serving-gateway (S-GW) 3a-30. User equipment (hereinafter, UE or terminal) 3a-35 may access an external network through the base stations 3a-05, 3a-10, 3a-15, and 3a-20 and the S-GW 3a-30.

As access nodes of a cellular network the base stations 3a-05, 3a-10, 3a-15, and 3a-20 provide radio accesses to UEs accessing a network. That is, in order to service users' traffics, the base stations 3a-05, 3a-10, 3a-15, and 3a-20 support connections between the UEs and a core network (CN) by performing scheduling through summarization of state information, such as a buffer state, an available transmission power state, and a channel state of the UEs. The MME 3a-25 is a device that takes charge of not only mobility management of the UE but also various kinds of control functions, and is connected to the plurality of base stations, and the S-GW 3a-3a is a device that provides a data bearer. Further, the MME 3a-25 and the S-GW 3a-30 may further perform UE authentication and bearer management, and process packets arrived from the base stations 3a-05, 3a-10, 3a-15, and 3a-20 or packets to be transferred to the base stations 3a-05, 3a-10, 3a-15, and 3a-20.

Figure 3B:
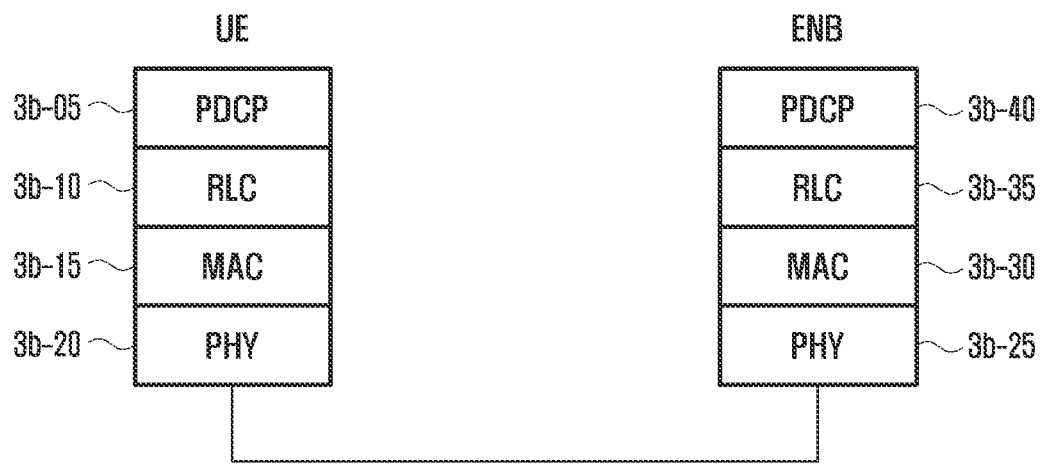
FIG. 3B is a diagram illustrating a radio protocol structure of an LTE system for reference in explaining the disclosure.

FIG. 3B is a diagram illustrating a radio protocol structure of an LTE system for reference in explaining the disclosure. Although a radio protocol structure in an NR to be defined hereinafter may be somewhat different from the radio protocol structure in the drawing, explanation thereof will be made for convenience in explaining the disclosure.

Referring to FIG. 3B, in the UE and the base station, the radio protocol of the LTE system may be composed of a packet data convergence protocol (PDCP) 3b-05 or 3b-40, a radio link control (RLC) 3b-10 or 3b-35, and a medium access control (MAC) 3b-15 or 3b-30. The packet data convergence protocol (PDCP) 3b-05 or 3b-40 may take charge of IP header compression/decompression operations, and a radio link control (hereinafter, RLC) 3b-10 or 3b-35 reconfigures a PDCP packet data unit (PDU) with a proper size. The MAC 3b-15 or 3b-30 is connected to several RLC layer devices configured in one UE, and performs multiplexing/demultiplexing of RLC PDUs into/from a MAC PDU. The physical layer 3b-20 or 3b-25 performs channel coding and modulation of upper layer data, makes and transmits an OFDM symbol to a radio channel, or performs demodulation and channel decoding of the OFDM symbol received on the radio channel, and transfers the channel-decoded OFDM symbol to an upper layer. Further, the physical layer uses hybrid ARQ (HARQ) for additional error correction, and a reception end transmits whether to receive the packet transmitted by a transmission end with 1 bit. This is called HARQ ACK/NACK information. Downlink HARQ ACK/NACK information for uplink transmission is transmitted on a physical channel (physical hybrid-ARQ indicator channel (PHICH)), and uplink HARQ ACK/NACK information for downlink transmission may be transmitted on a physical channel (physical uplink control channel (PUCCH) or physical uplink shared channel (PUSCH)). The PUCCH is used for the UE to transfer not only the HARQ ACK/NACK information but also downlink channel status information (CSI) and scheduling request (SR) to the base station. The SR is 1-bit information, and if the UE transmits the SR onto a resource in the PUCCH configured by the base station, the base station recognizes the existence of data that the corresponding UE will send to the uplink, and assigns an uplink resource. The UE may transmit a detailed buffer status report (BSR) message on the uplink resource. The base station may assign a plurality of SR resources to one UE.

Meanwhile, the PHY layer may be composed of one or a plurality of frequencies/carriers, and a technology to simultaneously configure and use a plurality of frequencies is called carrier aggregation (hereinafter referred to as "CA"). The CA technology can remarkably increase throughput as many as the number of secondary carriers by additionally using one primary carrier and a plurality of secondary carriers rather than using only one carrier for communication between a user equipment (UE) and a base station (E-UTRAN NodeB (eNB)). On the other hand, in LTE, a cell in the base station using the primary carrier is called a primary cell (PCell), and a cell using the secondary carrier is called a secondary cell (SCell). A technology to expand the CA function to two base stations is called dual connectivity (hereinafter referred to as "DC". In the DC technology, the UE simultaneously connects and uses a master base station (master E-UTRAN NodeB (hereinafter referred to as "MeNB")) and a secondary base station (secondary E-UTRAN NodeB (hereinafter referred to as SeNB), and cells belonging to the master base station is called a master cell group (hereinafter referred to as "MCG"), and cells belonging to a secondary base station is called a secondary cell group (hereinafter referred to as "SCG"). There is a representative cell for each cell group, and a representative cell of the master cell group is called a primary cell (hereinafter, referred to as "PCell"), and a representative cell of the secondary cell group is called a primary secondary cell (hereinafter referred to as "PSCell". When the NR is used, the MCG may be used as LTE technology, the SCG may be used as NR, and the UE may use the LTE and NR at the same time.

Although not illustrated in the drawing, at the top of the PDCP layer of the UE and the base station, a radio resource control (hereinafter referred to as "RRC") layer is present, and the RRC layer may send and receive an access and measurement related configuration control message for radio resource control. For example, the base station may instruct the UE to perform measurement by using a message of the RRC layer, and the UE may report the result of the measurement to the base station by using the message of the RRC layer.

Meanwhile, the transmission units of the PCell and the SCell may be the same or may be different from each other. For example, in LTE, the transmission units of the PCell and the SCell may be the same in the unit of 1 ms in all, whereas in NR, the transmission unit (slot) in the PCell is 1 ms, but the transmission unit in the SCell may have the length of 0.5 ms.

Table 4 below illustrates information on the length of a possible slot in each serving cell (i.e., PCell or SCell) in accordance with numerology (or subcarrier spacing) being used for each serving cell in NR.

TABLE 2

| | Subcarrier spacing (kHz) | | | | |
|---|---|---|---|---|---|
| | 15 | 30 | 60 | 120 | 240 |
| Transmission unit (slot) length (ms) | 1 | 0.5 | 0.25 | 0.125 | 0.00625 |
| The number of slots in subframe (1 ms) | 1 | 2 | 4 | 8 | 12 |

Further, in LTE and NR, the following units are used in a frame structure in a radio section (i.e., between the base station and the UE).

Meanwhile, the transmission units of the PCell and the SCell may be the same or may be different from each other. For example, in LTE, the transmission units of the PCell and the SCell may be the same in the unit of 1 ms in all, but in NR, the transmission unit (slot) in the PCell may be 1 ms, but the transmission unit in the SCell may have the length of 0.5 ms.

Radio Frame: It has the length of 10 ms, and is identified by a system frame number (SFN) for each radio frame.

Subframe: It has the length of 1 ms, and 10 subframes are present in the radio frame and are identified by subframe number of 0 to 9 in each radio frame.

Slot: As illustrated in the above table, it has the length in accordance with the configured value, and is the transmission unit when the base station and the UE transmit data.

Figure 3C:
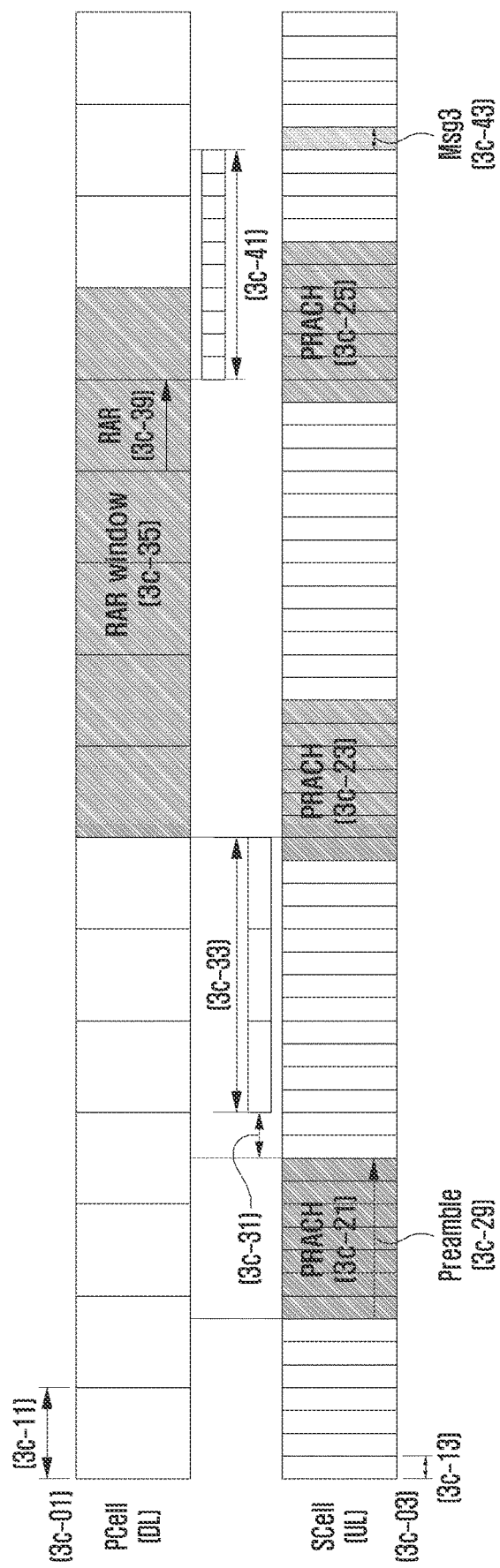
FIG. 3C is a diagram illustrating an embodiment schematizing the timing of performing a random access in a situation where a plurality of transmission units coexist.

FIG. 3C is a diagram illustrating an embodiment schematizing the timing of performing a random access in a situation where a plurality of transmission units coexist.

In this exemplary drawing, it is assumed that the UE is in a connected mode (RRC_CONNECTED) where the UE is connected to the base station, and is additionally configured with the SCell from the base station. The UE in the connected mode may transmit or receive data with the base station.

In case of configuring the SCell to the UE, the base station may provide detailed information, such as locations in time and frequency for a resource capable of performing the random access in the corresponding SCell. The resource capable of performing the random access is called a physical random access channel (PRACH), and in the drawing, it is denoted by 3c-21, 3c-23, or 3c-25. When the base station configures information on the PRACH resource to the UE, the start time of the PRACH resource in time is specified by a system frame number, subframe number, and a slot number of the configured serving cell. Accordingly, the UE grasps the PRACH resource location in the corresponding SCell.

In case that the UE determines to perform the random access for a reason of being instructed by the base station, the UE transmits a preamble in accordance with the configured PRACH resource information (3c-29). Accordingly, the UE attempts to receive a response message for a specific time period from the base station having received the preamble. The response message to the random access preamble is referred to as a random access response (RAR), and the specific time period is referred to as a RAR window (3c-35).

After the UE transmits the preamble, in consideration of the time in which the base station processes the preamble reception, the RAR window may start at a time point where a predetermined time has elapsed from the time when the preamble is transmitted. The predetermine time has a constant value regardless of the above-described numerology (or transmission unit length/subcarrier spacing), and is expressed by the number of reference slots. The length of the reference slot may be the slot length of a reference numerology, and the reference numerology may correspond to the longest subcarrier spacing. Further, the reference numerology may correspond to the subcarrier spacing being basically used in the PCell. In the exemplary drawing, it is assumed that the length of the reference slot is 3 (3c-33). Further, in order to match the slot boundary of the PCell, the calculation of the start time may start from a boundary surface of the first coming slot after the transmission of the preamble is ended (3c-31). The number of the reference slots may be configured by the base station when the PRACH information is configured, or a predetermined fixed value may be used as the number of the reference slots.

Accordingly, after the preamble transmission, the UE attempts to receive the RAR message from the base station after a predetermine time delay. In this case, as described above, the section in which the RAR message reception is attempted is called a RAR window, and the length of the RAR window is expressed as the number of PCell slots. In the exemplary drawing, it is assumed that the length of the RAR window corresponds to 6 slots of the PCell (3c-35). For each slot, the UE determines whether the RAR message is received.

If the preamble is properly received, the base station may transmit the RAR message for the received preamble (3c-39). The RAR message may include preamble identifier information on what preamble the RAR message responds to, and uplink resource assignment information for a cell to which the preamble is transmitted.

The UE having received the RAR message transmits a message in accordance with the uplink resource assignment information included in the RAR message (3c-43). The message being transmitted in accordance with the RAR assignment information is referred to as "message 3" (i.e., the preamble is referred to as "message 1", and the RAR is referred to as "message 2"). The transmission of the message 3 is performed after a predetermined number of slots after the RAR reception. In this case, the unit of the predetermined slot is the unit of a slot of a serving cell from which the preamble has been transmitted. In the exemplary drawing, a scenario in which transmission is performed after 10 slots (3c-41) is illustrated. The number of slots may also be configured by the base station when configuring the PRACH information, or a predetermined fixed value may be used therefor.

Accordingly, the UE may transmit Msg3 in accordance with the timing of the corresponding serving cell to adjust or reduce the transmission delay.

Figure 3D:
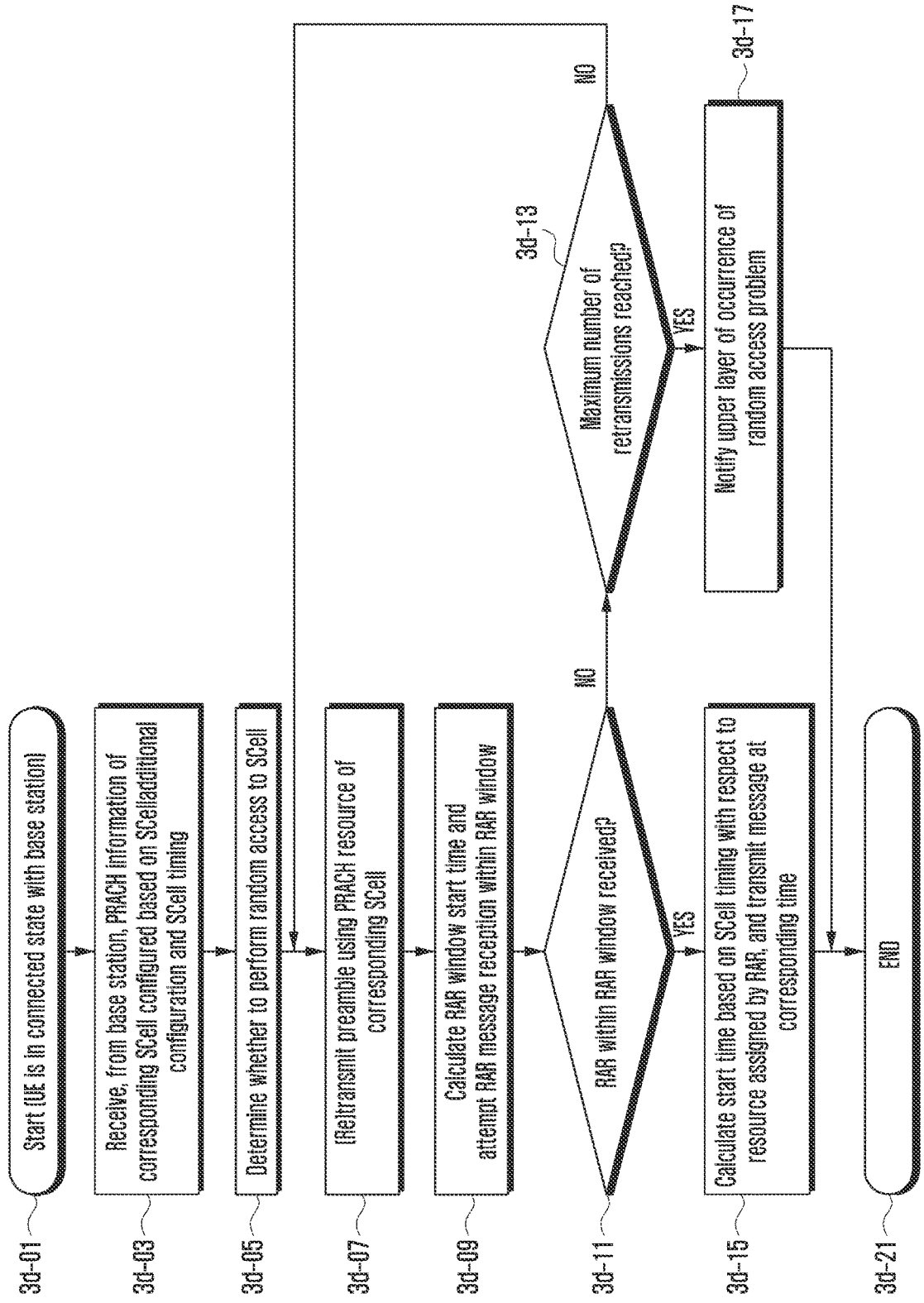
FIG. 3D is a diagram explaining an operation order of a UE when performing a random access in a situation where a plurality of transmission units coexist.

FIG. 3D is a diagram explaining an operation order of a UE when performing a random access in a situation where a plurality of transmission units coexist.

In the exemplary drawing, it is assumed that the UE is connected to the base station in a connected mode (RRC_CONNECTED) (3d-01). Thereafter, the UE is additionally configured with the SCell from the base station, and receives transmission unit information being used in the SCell.

Further, the UE may receive PRACH information of the corresponding SCell configured based on the SCell transmission unit (3d-03).

Thereafter, the UE may determine whether to perform the random access for the added SCell (3d-05). As the determination method, a method, by the base station, for instructing the UE to perform preamble transmission may be used. Accordingly, the UE transmits the random access preamble on the PRACH resource of the corresponding SCell in accordance with the configured information (3d-07).

Thereafter, the UE attempts the RAR reception by starting the RAR window after a predetermine time determined in accordance with the specific standard regardless of the numerology of the SCell as described above (3d-09). The specific standard may be the spacing unit in accordance with the longest subcarrier spacing, or may be the space unit in accordance with the numerology being used by the PCell.

Accordingly, if the RAR message is received in the RAR window composed of the number of slots of the PCell (3d-11), message 3 is transmitted at a time configured (or fixed) as the transmission unit (slot) of the SCell having transmitted the preamble with respect to the resource assigned by the corresponding RAR message (3d-15).

If the RAR message is not received (3d-11), it is determined whether the number of transmissions up to now has reached the maximum number of transmissions configured by the base station (3d-15), and if the number of transmissions has not reached the maximum number of transmissions, the preamble is retransmitted, whereas if the number of transmissions has reached the maximum number of transmissions, random access failure is reported to the upper layer (e.g., RRC layer) (3d-17).

Figure 3E:
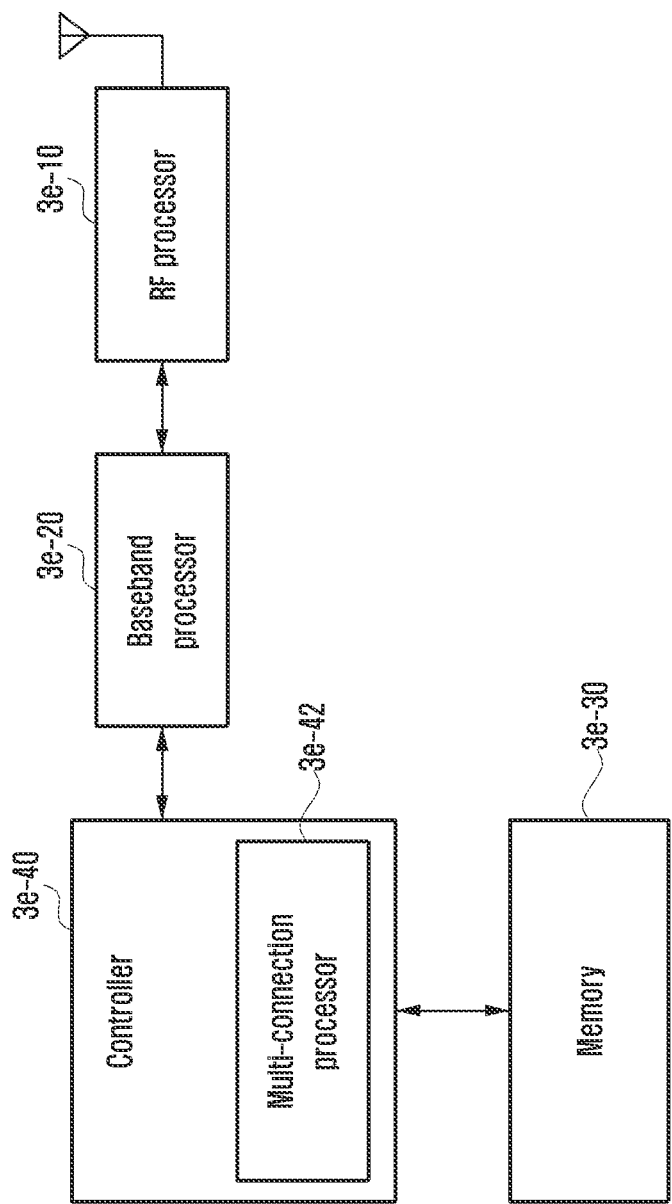
FIG. 3E is a block diagram of a terminal according to an embodiment of the disclosure.

FIG. 3E illustrates a block configuration of a UE according to an embodiment of the disclosure.

With reference to FIG. 3E, a UE may include a radio frequency (RF) processor 3-10, a baseband processor 3e-20, a storage unit 3e-30, and a controller 3e-40.

The RF processor 3e-10 performs a function for transmitting and receiving a signal through a radio channel, such as signal band conversion and amplification. That is, the RF processor 3e-10 performs up-conversion of a baseband signal provided from the baseband processor 3e-20 into an RF band signal to transmit the converted signal through an antenna, and performs down-conversion of the RF band signal received through the antenna into a baseband signal. For example, the RF processor 3e-10 may include a transmission filter, a reception filter, an amplifier, a mixer, an oscillator, a digital-to-analog converter (DAC), and an analog-to-digital converter (ADC). Although only one antenna is illustrated in FIG. 3E, the terminal may be provided with a plurality of antennas. Further, the RF processor 3e-10 may include a plurality of RF chains. Further, the RF processor 3e-10 may perform beamforming. For the beamforming, the RF processor 3e-10 may adjust phases and sizes of signals transmitted or received through the plurality of antennas or antenna elements.

The baseband processor 3e-20 performs conversion between a baseband signal and a bit string in accordance with the physical layer standard of the system. For example, during data transmission, the baseband processor 3e-20 generates complex symbols by encoding and modulating a transmitted bit string. Further, during data reception, the baseband processor 3e-20 may restore a received bit string by demodulating and decoding the baseband signal provided from the RF processor 3e-10. For example, in the case of following an orthogonal frequency division multiplexing (OFDM) scheme, during data transmission, the baseband processor 3e-20 may generate complex symbols by encoding and modulating a transmitted bit string, perform mapping of the complex symbols on subcarriers, and then configure OFDM symbols through an inverse fast Fourier transform (IFFT) operation and cyclic prefix (CP) insertion. Further, during data reception, the baseband processor 3e-20 may divide the baseband signal provided from the RF processor 3e-10 in the unit of OFDM symbols, restore the signals mapped on the subcarriers through a fast Fourier transform (FFT) operation, and then restore the received bit string through demodulation and decoding.

The baseband processor 3e-20 and the RF processor 3e-10 transmit and receive the signals. Accordingly, the baseband processor 3e-20 and the RF processor 3e-10 may be called a transmitter, a receiver, a transceiver, or a communication unit. Further, in order to support different radio access technologies, at least one of the baseband processor 3e-20 and the RF processor 3e-10 may include different communication modules. The different frequency bands may include super high frequency (SHF) (e.g., 2.5 GHz or 5 GHz) band and millimeter wave (mmWave) (e.g., 60 GHz) band.

The storage unit 3e-30 stores therein a basic program for an operation of the terminal, application programs, and data such as setup information.

The controller 3e-40 controls the overall operation of the terminal. For example, the controller 3e-40 may control to transmit and receive signals through the baseband processor 3e-20 and the RF processor 3e-10. Further, the controller 3e-40 records or reads data in or from the storage unit 3e-30. For this, the controller 3e-40 may include at least one processor. For example, the controller 3e-40 may include a communication processor (CP) performing a control for communication and an application processor (AP) controlling an upper layer, such as an application program. According to an embodiment of the disclosure, the controller 3e-40 includes a multi-connection processor 3e-42 that performs processing to operate in a multi-connection mode. For example, the controller 3e-40 may control the UE to perform a procedure illustrated in an operation of the UE illustrated in FIG. 3E.

According to an embodiment of the disclosure, the UE transmits the preamble in accordance with the information configured by the base station, attempts reception of the RAR message in accordance with the above-described timing calculation method, and if the RAR message reception is successful, transmits message 3 by calculating the timing of transmitting the message 3.

Methods according to the claims or the embodiments described in the specification may be implemented in the form of hardware, software, or a combination of hardware and software.

In case of implementation by software, a computer readable storage medium storing one or more programs (software modules) may be provided. The one or more programs stored in the computer readable storage medium may be configured for execution by one or more processors in the electronic device. The one or more programs include instructions causing the electronic device to execute the methods according to the claims of the disclosure or the embodiments described in the specification.

Such programs (software modules or software) may be stored in a nonvolatile memory including a random access memory and a flash memory, a read only memory (ROM), an electrically erasable programmable read only memory (EEPROM), a magnetic disc storage device, a compact disc-ROM (CD-ROM), a digital versatile discs (DVDs), or other types of optical storage devices, and a magnetic cassette. Further, the programs may be stored in a memory composed of a combination of some or all of them. Further, a plurality of memories may be included in the respective configurations.

Further, the programs may be stored in an attachable storage device that can be accessible through a communication network composed of the Internet, Intranet, local area network (LAN), a wide LAN (WLAN), or a communication network, such as a storage area network (SAN), or a communication network composed of a combination thereof.

In the above-described detailed embodiments of the disclosure, the elements included in the disclosure may be expressed in the singular or plural form depending on the proposed detailed embodiment. However, the singular or plural expression has been selected suitably for a situation proposed for convenience of description, and the disclosure is not limited to the singular or plural elements. Although an element has been expressed in the plural form, it may be configured in the singular form. Although an element has been expressed in the singular form, it may be configured in the plural form.

Although the detailed embodiments have been described in the detailed description of the disclosure, the disclosure may be modified in various ways without departing from the scope of the disclosure. Accordingly, the scope of the disclosure should not be limited to the above-described embodiments, but should be defined by not only the claims, but equivalents thereof.

According to an embodiment of the disclosure, the terminal determines a slot for monitoring the PDCCH according to the DRX configuration information configured from the base station and receives, transmits, and retransmits the PDCCH to reduce the power consumption of the terminal while reducing a delay.

Methods according to the claims or the embodiments described in the claims or the specification of the disclosure may be implemented in hardware, software, or a combination of hardware and software.

When implemented in software, a computer-readable storage medium storing one or more programs (software modules) may be provided. One or more programs stored on a computer-readable storage medium are configured for execution by one or more processors in an electronic device (configured for execution). The one or more programs include instructions that cause the electronic device to perform the methods according to the embodiments disclosed in the claims or the specification of the disclosure.

Such programs (software modules and software) may be stored in a memory such as a random access memory, a non-volatile memory including a flash memory, a read only memory (ROM), an electrically erasable programmable ROM (EEPROM), a magnetic disc storage device, a compact disc-ROM (CD-ROM), a digital versatile disc (DVD) or other types of optical storage devices, or a magnetic cassette. Alternatively, the programs may be stored in a memory configured by combinations of some or all of them. Further, multiple configuration memories may be included.

In addition, the program may be stored in attachable storage devices which may be accessed through a communication network such as a communication network such as the Internet, an Intranet, a LAN, a wide LAN (WLAN, or a storage area network (SAN) and a communication network configured by a combination thereof. Such a storage device may be connected to an apparatus that performs an embodiment of the disclosure via an external port. Further, a separate storage device on the communication network may be connected to an apparatus that performs an embodiment of the disclosure.

In the specific embodiments of the disclosure described above, the elements included in the disclosure are expressed singular or plural in accordance with the specific embodiment shown. However, it is to be understood that the singular or plural representations are selected appropriately for the sake of convenience of description, and the disclosure is not limited to the singular or plural constituent elements, and even elements by the plural representations may be constituted by a single element or even an element by the singular representation may be constituted by plural elements.

While the disclosure has been shown and described with reference to various embodiments thereof, it will be understood by those skilled in the art that various changes in form and details may be made without departing from the spirit and scope of the disclosure as defined by the appended claims and their equivalents.

What is claimed is:

1. A method performed by a terminal in a wireless communication system, the method comprising:
   transmitting, to a base station on a secondary cell (SCell), a random access preamble based on a first subcarrier spacing;
   receiving, from the base station on a primary cell (PCell), a random access response (RAR) message for the random access preamble based on a second subcarrier spacing, the RAR message including an uplink grant; and
   transmitting, to the base station on the SCell, a message 3 (Msg 3) using the uplink grant based on the first subcarrier spacing,
   wherein a duration between a reception of the RAR message and a transmission of the Msg 3 is determined based on the first subcarrier spacing.

2. The method of claim 1,
   wherein receiving the RAR message further comprises monitoring the RAR message within a RAR window, and
   wherein a length of the RAR window is configured in number of slots based on the second subcarrier spacing.

3. The method of claim 1, further comprising:
   receiving, from the base station, information for configuring the SCell, the information for configuring the SCell including physical random access configuration information,
   wherein the random access preamble is transmitted based on the random access configuration information.

4. The method of claim 3, wherein the random access configuration information includes first information on a resource for a random access, second information on preambles used for the random access, and third information on a threshold value.

5. The method of claim 1, wherein the RAR message further includes information on an identity associated with the random access preamble.

6. The method of claim 1, further comprising:
   receiving, from the base station, a physical downlink control channel (PDCCH) order to trigger a transmission of the random access preamble.

7. A terminal in a wireless communication system, the terminal comprising:
a transceiver; and
a controller configured to:
control the transceiver to transmit, to a base station on a secondary cell (SCell), a random access preamble based on a first subcarrier spacing,
control the transceiver to receive, from the base station on a primary cell (PCell), a random access response (RAR) message for the random access preamble based on a second subcarrier spacing, the RAR message including an uplink grant, and
control the transceiver to transmit, to the base station on the SCell, a message 3 (Msg 3) using the uplink grant based on the first subcarrier spacing,
wherein a duration between a reception of the RAR message and a transmission of the Msg 3 is determined based on the first subcarrier spacing.

8. The terminal of claim 7,
wherein the controller is further configured to monitor the RAR message within a RAR window, and
wherein a length of the RAR window is configured in number of slots based on the second subcarrier spacing.

9. The terminal of claim 7,
wherein the controller is further configured to control the transceiver to receive, from the base station, information for configuring the SCell, the information for configuring the SCell including physical random access configuration information, and
wherein the random access preamble is transmitted based on the random access configuration information.

10. The terminal of claim 9, wherein the random access configuration information includes first information on a resource for a random access, second information on preambles used for the random access, and third information on a threshold value.

11. The terminal of claim 7, wherein the RAR message further includes information on an identity associated with the random access preamble.

12. The terminal of claim 7, wherein the controller is further configured to control the transceiver to receive, from the base station, a physical downlink control channel (PDCCH) order to trigger a transmission of the random access preamble.

* * * * *